(12) United States Patent
Kikuchi

(10) Patent No.: US 8,161,198 B2
(45) Date of Patent: Apr. 17, 2012

(54) UNINSTALLING DRIVERS OF A PERIPHERAL DEVICE

(75) Inventor: Hiroshi Kikuchi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1216 days.

(21) Appl. No.: 11/552,766

(22) Filed: Oct. 25, 2006

(65) Prior Publication Data

US 2007/0124513 A1    May 31, 2007

(30) Foreign Application Priority Data

Oct. 27, 2005    (JP) .................................. 2005-313161

(51) Int. Cl.
G06F 3/00    (2006.01)
(52) U.S. Cl. .......................................................... 710/8
(58) Field of Classification Search ................. 358/1.15; 710/8

See application file for complete search history.

(56) References Cited

U.S. PATENT DOCUMENTS

| | | | |
|---|---|---|---|
| 5,706,411 A * | 1/1998 | McCormick et al. | 358/1.14 |
| 5,819,107 A | 10/1998 | Lichtman et al. | |
| 5,862,393 A | 1/1999 | Davis | |
| 6,336,152 B1 | 1/2002 | Richman et al. | |
| 6,496,979 B1 | 12/2002 | Chen et al. | |
| 6,981,252 B1 | 12/2005 | Sadowsky | |
| 7,032,220 B2 | 4/2006 | Curtis | |
| 7,185,335 B2 | 2/2007 | Hinda et al. | |
| 7,299,494 B2 | 11/2007 | Katsuda | |
| 7,536,698 B2 | 5/2009 | Machida | |
| 7,665,084 B2 * | 2/2010 | Suzuki et al. | 717/174 |
| 2002/0042911 A1 | 4/2002 | Harms | |
| 2002/0083227 A1 | 6/2002 | Machida | |
| 2002/0174206 A1 | 11/2002 | Moyer et al. | |
| 2004/0003112 A1 | 1/2004 | Alles et al. | |
| 2004/0006766 A1 | 1/2004 | Kim | |
| 2004/0060045 A1 | 3/2004 | Hinda et al. | |
| 2004/0064458 A1 | 4/2004 | Hagarty | |
| 2004/0177202 A1 | 9/2004 | Won | |
| 2004/0179230 A1 * | 9/2004 | Kitada et al. | 358/1.15 |

(Continued)

FOREIGN PATENT DOCUMENTS

| | | |
|---|---|---|
| JP | 2002-366502 | 12/2002 |
| JP | 2003-114772 A | 4/2003 |
| JP | 2003-285510 | * 10/2003 |
| JP | 2004-38956 | 2/2004 |
| JP | 2004-280218 | 10/2004 |
| JP | 2004-362594 | 12/2004 |
| JP | 2005-028728 A | 2/2005 |
| JP | 2005-092895 A | 4/2005 |

OTHER PUBLICATIONS

UPnP(TM) Device Architecture version 1.0, Oct. 15, 2008 (Internet URL: http://www.upnp.org/specs/arch/UPnP-arch-DeviceArchitecture-v.
"Web Service Dynamic Discovery (WS-Discovery)", Apr. 2005 (Internet URL: http://specs.xmlsoap.org/ws/2005104/discovery/ws-discovery.pdf).
WS-MetadataExchange, Aug. 2006, Microsoft Corporation, Inc. (Internet URL: http://specs.xmlsoap.org/ws/2004/09/mex/ws-metadataexchange.pdf).

Primary Examiner — Benny Tieu
Assistant Examiner — Eric A Rust
(74) Attorney, Agent, or Firm — Carter, DeLuca, Farrell & Schmidt LLP

(57) ABSTRACT

According to the present invention, an information processing apparatus which can communicate with a peripheral device that issues a message including state information, comprises
a reception unit adapted to receive a leaving message from the peripheral device;
an analysis unit adapted to analyze the leaving message received from the peripheral device; and
an uninstall unit adapted to uninstall, when said analysis unit analyzes that information included in the leaving message is an uninstall notification indicating that a device driver corresponding to the peripheral device which sent the leaving message is to be uninstalled, a driver program corresponding to the peripheral device that sent the leaving message.

9 Claims, 22 Drawing Sheets

U.S. PATENT DOCUMENTS

| | | |
|---|---|---|
| 2004/0184074 A2* | 9/2004 | Leiman et al. ............... 358/1.15 |
| 2004/0221081 A1* | 11/2004 | Yao et al. ...................... 710/302 |
| 2004/0249907 A1 | 12/2004 | Brubacher et al. |
| 2004/0250265 A1 | 12/2004 | Suzuki et al. |
| 2005/0102667 A1 | 5/2005 | Barta et al. |
| 2006/0031205 A1 | 2/2006 | Perkins et al. |
| 2006/0044586 A1 | 3/2006 | Kujirai et al. |
| 2006/0122848 A1 | 6/2006 | Takagi |
| 2006/0258342 A1 | 11/2006 | Fok et al. |
| 2007/0101345 A1 | 5/2007 | Takagi |
| 2007/0156942 A1 | 7/2007 | Gough |
| 2008/0082976 A1 | 4/2008 | Steinwagner et al. |
| 2008/0095359 A1 | 4/2008 | Schreyer et al. |

* cited by examiner

| TYPE OF BYE REQUEST | TIMING OF REQUEST | ADDITIONAL INFORMATION |
|---|---|---|
| "Bye REQUEST" | NORMAL OFFLINE STATE | — |
| "Bye REQUEST UPON SLEEP" | WHEN DEVICE GOES TO SLEEP STATE | AVERAGE RESUME TIME (SEC) |
| "Bye REQUEST UPON TROUBLE" | WHEN DEVICE FAILURE OCCURS | TROUBLE STATUS / RECOVERY METHOD |
| "LAST Bye REQUEST" | WHEN DEVICE WILL NEVER BE CONNECTED TO CURRENT ENVIRONMENT IN FUTURE | — |

FIG. 4B

| SOURCE | DESTINATION | MESSAGE ID | TYPE | ADDITIONAL INFORMATION |
|---|---|---|---|---|
| 1511 | 1512 | 1513 | 1514 | 1515 |

FIG. 10

| DEVICE NAME | MODEL | IP ADDRESS | DISCARDED | TROUBLE | SLEEP | OFFLINE |
|---|---|---|---|---|---|---|
| PRINTER 1 | C COMPANY PRINTER 1 | 123.456.789.012 | ○ | — | — | — |
| PRINTER 2 | C COMPANY PRINTER 2 | 123.456.789.123 | — | — | ○ | — |
| PRINTER 3 | C COMPANY PRINTER 3 | 123.456.789.234 | — | — | — | ○ |
| ... | ... | ... | ... | ... | ... | ... |

1010, 1011, 1012, 1013, 1014, 1015, 1016, 1017

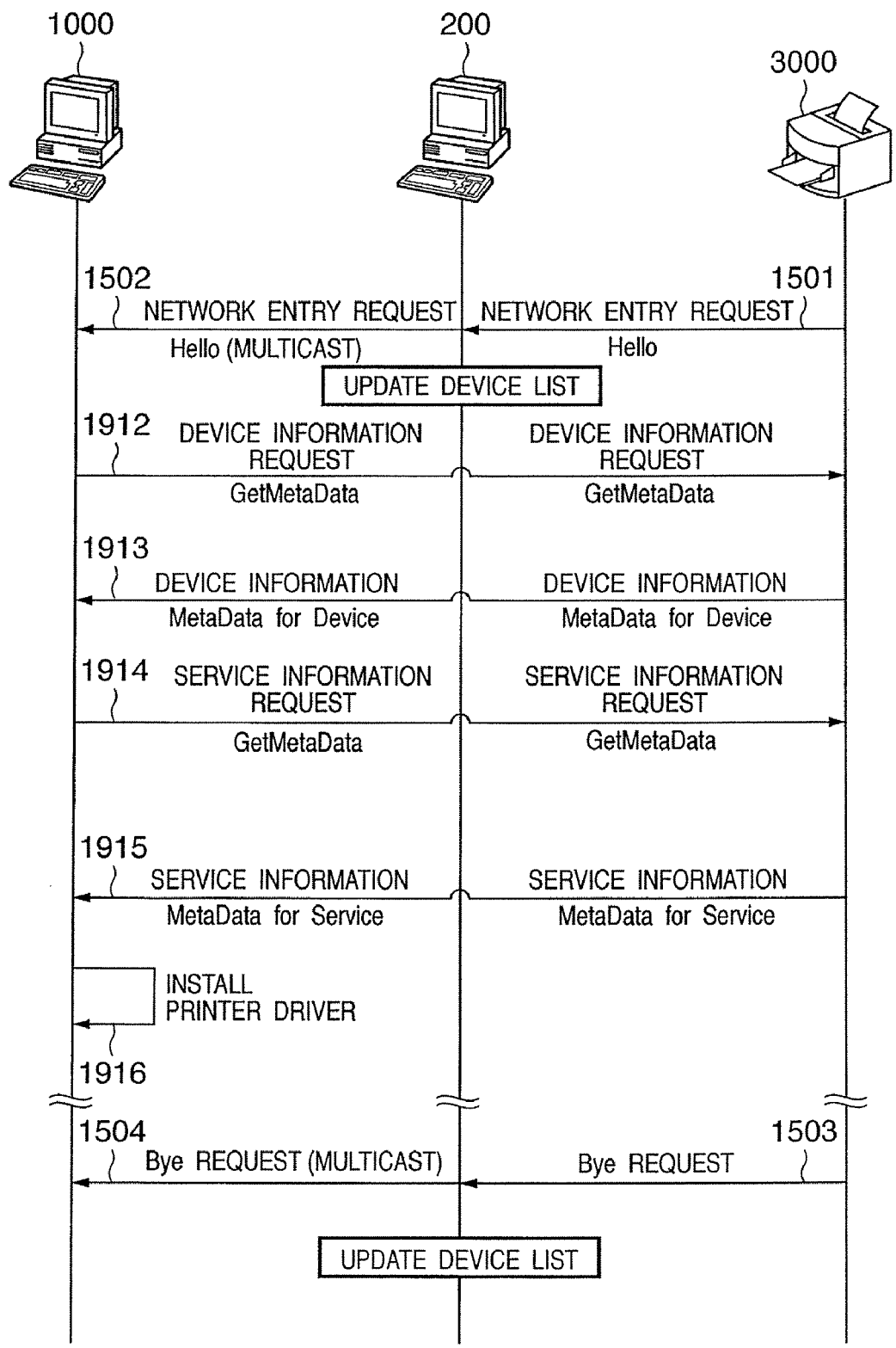

F I G. 15B

| SOURCE | DESTINATION | MESSAGE ID | TYPE | ADDITIONAL INFORMATION | PRINTER ID |
|---|---|---|---|---|---|
| 1511 | 1512 | 1513 | 1514 | 1515 | 1516 |

FIG. 16

| DEVICE NAME | ADDRESS | DRIVER NAME | UNINSTALLER NAME | ICON NAME | ADDITIONAL INFORMATION |
|---|---|---|---|---|---|
| 1601 | 1602 | 1603 | 1604 | 1605 | 1606 |
| AAAA | XX.YY.ZZ.WW | abcd | efgh | jkl.m | zzzz |

PROCEED TO DRIVER UNINSTALLATION ?

OK

1901

UNINSTALLING DRIVERS OF A PERIPHERAL DEVICE

BACKGROUND OF THE INVENTION

1. Field of the Invention

The present invention relates to a program and method for managing, e.g., a device driver of an information processing apparatus connected to a network, an information processing apparatus, and a network print system.

2. Description of the Related Art

Along with enhancements of networks such as the Internet, home networks, and the like, network compatibility of user interactive devices such as a PDA, portable phone, and the like, and image processing devices such as a scanner, printer, copying machine, digital camera, and the like, has advanced. Also, network compatibility of various devices with regard to electronic home appliances such as a television, air conditioner, refrigerator, and the like has advanced. In order to improve convenience, and to allow easy management using such network compatible devices, various protocols and architectures that provide functions of managing network devices have been proposed (patent references 1 and 2). The functions to be provided include a search function of network devices which provide services, an automatic setup function of application software, utility software, an operating system, and the like required to control network devices, and the like.

An attempt to automate network device management has also been made. For example, development of UPnP® and WSD: Web Services for Devices (WS-Discovery/WS-MetadataExchange) has been made by Microsoft Corporation as an actor. Such techniques implement so-called plug-and-play that allows use of a device by connecting that device to the network. Also, BMLinks® promoted by Japan Business Machine and Information System Industries Association (JBMIA), Rendezvous supported by OS X developed by Apple Computer, Inc., and the like are available. With techniques such as UPnP® and the like, when a computer detects a network device, its device driver is installed in the computer (if necessary).

Furthermore, a technique in which a client computer connected to the network searches for an installed printer on the network upon its startup, and uninstalls its printer driver if that printer is not detected, has been disclosed (patent reference 3). Moreover, a technique in which a print server that manages network printers always monitors the connection status of the printers, and informs a client of deletion of a printer if it detects the printer deleted from the networks has also been disclosed (patent reference 4).

[Patent Reference 1] Japanese Patent Laid-Open No. 2004-038956

[Patent Reference 2] Japanese Patent Laid-Open No. 2004-362594

[Patent Reference 3] Japanese Patent Laid-Open No. 2002-366502

[Patent Reference 4] Japanese Patent Laid-Open No. 2004-280218

However, the convenience of network devices improves due to prevalence of plug-and-play in the network devices, while negative effects resulting from automatic installation of drivers of devices connected to the network are also produced. One negative effect is an unlimited increase in the number of drivers installed in a client computer. This phenomenon is most noticeable in client PCs (personal computers) and the like, which are installed in a large-scale office having a large number of network printers and have long periods of service. In such a network, network devices such as printers and the like are often updated or added. In the client computer, drivers of removed devices remain stored, and drivers corresponding to added devices are additionally installed. For this reason, hardware resources of the client computer such as a hard drive, memory, and the like are wasted. In addition, upon, e.g., printing from an application, such large number of drivers may introduce confusion as to selection of a printer to be used.

To avoid such confusion, it is required to uninstall all printer drivers corresponding to printers removed from the network. However, uninstallation must be manually done, and the network that connects a large number of client computers requires a lot of man-hours to uninstall drivers for respective client computers.

According to the technique described in patent reference 3, an unlimited increase in number of drivers can be prevented since the driver of a printer which is not connected can be uninstalled. However, since all the client computers of the network must poll printers upon their startup, a heavy load is unwantedly imposed on the network. With this method, a printer driver corresponding to a printer which is temporarily down is automatically uninstalled. This results in inconvenience, and installation and uninstallation which are not required under ordinary circumstances are done to cause an operation efficiency drop. In addition, automatic device recognition traffic (PnP) increases.

The technique of patent reference 4 cannot be applied to a network printer environment in which ports are directly connected to printers, since the print server is indispensable in a network environment.

SUMMARY OF THE INVENTION

The present invention has been made in consideration of the above prior art, and has as its object to automatically uninstall a device driver installed in a client computer for a device (printer or the like) which can no longer be used due to, e.g., removal from a network. Another object of the present invention is to prevent waste of resources by unnecessary device drivers which remain installed on a client computer.

Still another object of the present invention is to control uninstallation of a driver based on a designation by an administrator of a device by notifying a client of temporary or permanent removal of the device from the network in accordance with the designation by the administrator. Still another object of the present invention to allow the client to surely receive the notification by making the notification to the client by a network proxy.

In order to achieve the above objects, the present invention comprises the following arrangement. An information processing apparatus which can communicate with a peripheral device that issues a message including state information comprises:

a reception unit adapted to receive a leaving message from the peripheral device;

an analysis unit adapted to analyze the leaving message received from the peripheral device; and an uninstall unit adapted to uninstall, when the analysis unit analyzes that information included in the leaving message is an uninstall notification indicating that a device driver corresponding to the peripheral device which sent the leaving message is to be uninstalled, a driver program corresponding to the peripheral device that sent the leaving message.

An information processing apparatus which can communicate with a peripheral device that issues a message and a client computer, comprises:

a reception unit adapted to receive a message;

an analysis unit adapted to analyze the message received by the reception unit;

a peripheral device list management unit adapted to manage, when the analysis unit analyzes that the analyzed message is a leaving message from the peripheral device, state information corresponding to the peripheral device as a transmission source of the leaving message based on a type of information included in the leaving message;

a determination unit adapted to determine, when the analysis unit analyzes that the analyzed message is a use request message from the client computer which requests to use the peripheral device, a state corresponding to the peripheral device the use of which is requested by the use request message based on the state information managed by the peripheral device list management unit; and a message proxy unit adapted to send, when the determination unit determines that the state information of the peripheral device requested by the use request is the state according to the type of information included in the leaving message, a notification indicating that the peripheral device leaves from a network to the client computer as a request source of the use request.

A peripheral device which can communicate with a computer, comprises:

an input unit adapted to input an instruction by an operator; and a sending unit adapted to send, when the input unit instructs to uninstall a device driver corresponding to the peripheral device, a leaving message including information indicating uninstallation of the device driver corresponding to the peripheral device.

The above arrangement can prevent resources from being wasted by unnecessary device drivers which remain installed on a client computer.

Since a client is notified of temporary or permanent removal of a device from a network in accordance with a designation by an administrator of that device, the designation can control uninstallation of a driver. Since a proxy notifies the client in lieu of the network, the client can surely receive that notification.

Further features of the present invention will become apparent from the following description of exemplary embodiments with reference to the attached drawings.

BRIEF DESCRIPTION OF THE DRAWINGS

FIGS. 4A and 4B show the types of a Bye request upon classifying the Bye request;

FIG. 10 shows an example of a device list held by a proxy;

FIGS. 15A and 15B are sequence charts of WS-Discovery according to the second embodiment;

FIG. 16 shows an example of an installed device list held by the client;

FIG. 19 shows an example of a single-interface UI 1901.

DESCRIPTION OF THE EMBODIMENTS

First Embodiment

Preferred embodiments of the present invention will be described in detail hereinafter with reference to the accompanying drawings. Note that protocols, numerical values, and the like described in the embodiment are merely an example, and the scope of the present invention is not limited to them.

Hardware Arrangement of Print System

Figure 1:
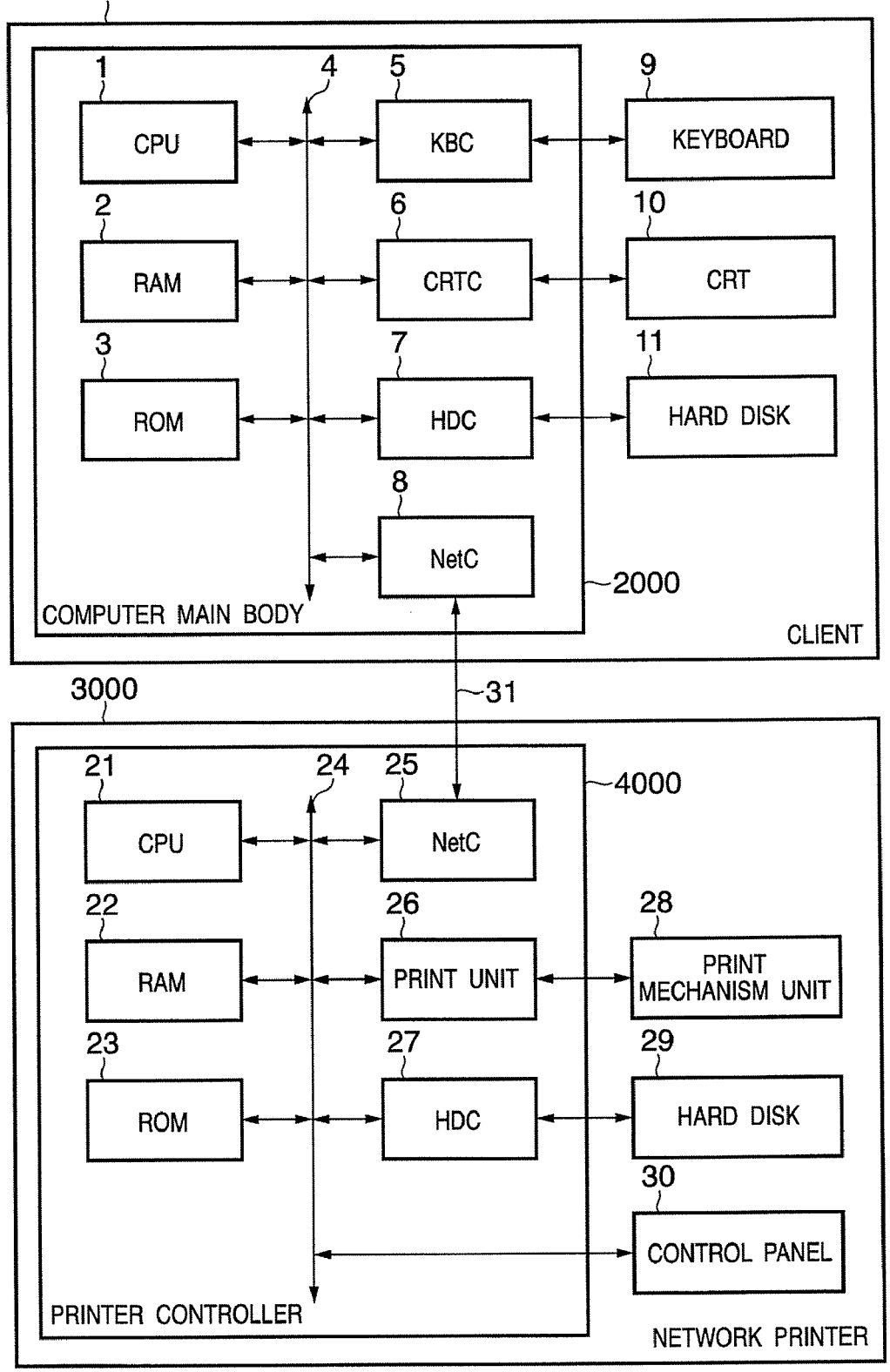
FIG. 1 is a block diagram of a hardware arrangement showing connection between a client and network printer according to one embodiment of the present invention.

FIG. 1 is a block diagram showing a hardware arrangement focusing on one client and one network printer, which are connected to a network print system according to the embodiment of the present invention. FIG. 1 shows an arrangement in which a client 1000 and a network printer 3000 as a printer are connected via a network 31. In the client 1000, a keyboard 9, CRT 10, hard disk 11, and the like as external devices are connected to a computer main body 2000. The computer main body 2000 comprises a CPU 1, which can make arithmetic operations by mapping control programs and applications stored in a ROM 3 or the hard disk 11 on a RAM 2. A keyboard controller (KBC) 5 controls inputs from the keyboard 9 as the external device. A CRT controller (CRTC) 6 controls display on the CRT 10. A hard disk controller (HDC) 7 controls inputs and outputs to and from the hard disk 11. Reference numeral 8 denotes a network controller (NetC), which is connected to the printer 3000 via the network 31 and controls communications with a printer controller 4000.

The CPU 1, RAM 2, ROM 3, KBC 5, CRTC 6, HDC 7, and NetC 8 are respectively connected via a system bus, and the CPU 1 systematically controls the respective devices. The hard disk 11 or RAM 2 holds an installed device list 1600 (FIG. 16) which especially indicates installed states of device drivers of network printers in this embodiment. The installed device list 1600 includes a name (identifier), IP address, driver name, and icon file name used in display of each device which is recognized by the UPnP function provided by an OS installed in the computer 1000. Note that the OS indicates an operating system. These pieces of information can also be obtained from a registry as a database of system information managed by the operating system. Hence, the same pieces of information as those in the installed device list 1600 shown in FIG. 16 can be referred to with reference to the registry. That is, this embodiment has the installed device list, but the installed device list need not be specially prepared if the registry is used.

Note that this embodiment assumes a personal computer (PC) as the client. However, the client is not limited to the PC as long as it can carry out the present invention, and a portable information terminal such as a PDA or the like, a portable phone, digital home appliances, and the like may be used as the client. Any of these devices has the same arrangement as that of the computer 1000 shown in FIG. 1, except for input and output devices for specific use purposes.

In the network printer 3000, a printer CPU 21 executes control programs stored in a program area of a ROM 23. Upon execution of the control programs, the printer CPU 21 systematically controls access to various devices connected to a bus 24 to output an image signal as print data to a print mechanism unit 28 (printer engine) connected via a print unit 26.

The CPU 21 can execute communication processing with the client 1000 via a network controller (NetC) 25. The CPU 21 can notify the client 1000 of information and the like in the network printer 3000 via communications. A RAM 22 serves as a main memory, work area, and the like of the CPU 21. The RAM 22 is also used as a bitmap memory, video signal information storage area, and the like for storing print data and image bitmap data received from the client 1000. A hard disk 29 controlled by a hard disk controller 27 is used for BOX storage and the like of print job data. A control panel 30 is a user interface used when the user operates the network printer 3000, and includes a touch panel type liquid crystal panel, and the like in addition to various switches, LED indicators, and the like. Via this control panel 30, the user can input an instruction to separate and remove that printer 3000 from the network, i.e., an instruction to permanently remove it. Information indicating this instruction is stored in the RAM 22, and becomes the basis for determining the type of a bye message which is transmitted from the printer 3000 and indicates separation from the network.

The hard disk 29 stores a configuration information database indicating the configuration of the printer 3000. The configuration database includes device type information, service information, use frequency information of the device, print speed information, color function information indicating the presence/absence of a color print function, highest resolution information, double-sided printing function information indicating the presence/absence of a double-sided printing function, manufacturer information, and the like.

Note that the network printer 3000 may be either a single-function printer or a multi-function printer that comprises a copy function, facsimile function, and the like, as long as that device can carry out the functions of the present invention. The functions of the present invention are not limited by the print mechanism unit 28 which adopts any of print systems such as a laser beam printer, a printer using an ink-jet print mechanism, a thermal printer, and the like.

Functional Blocks of Print System

Figure 2:
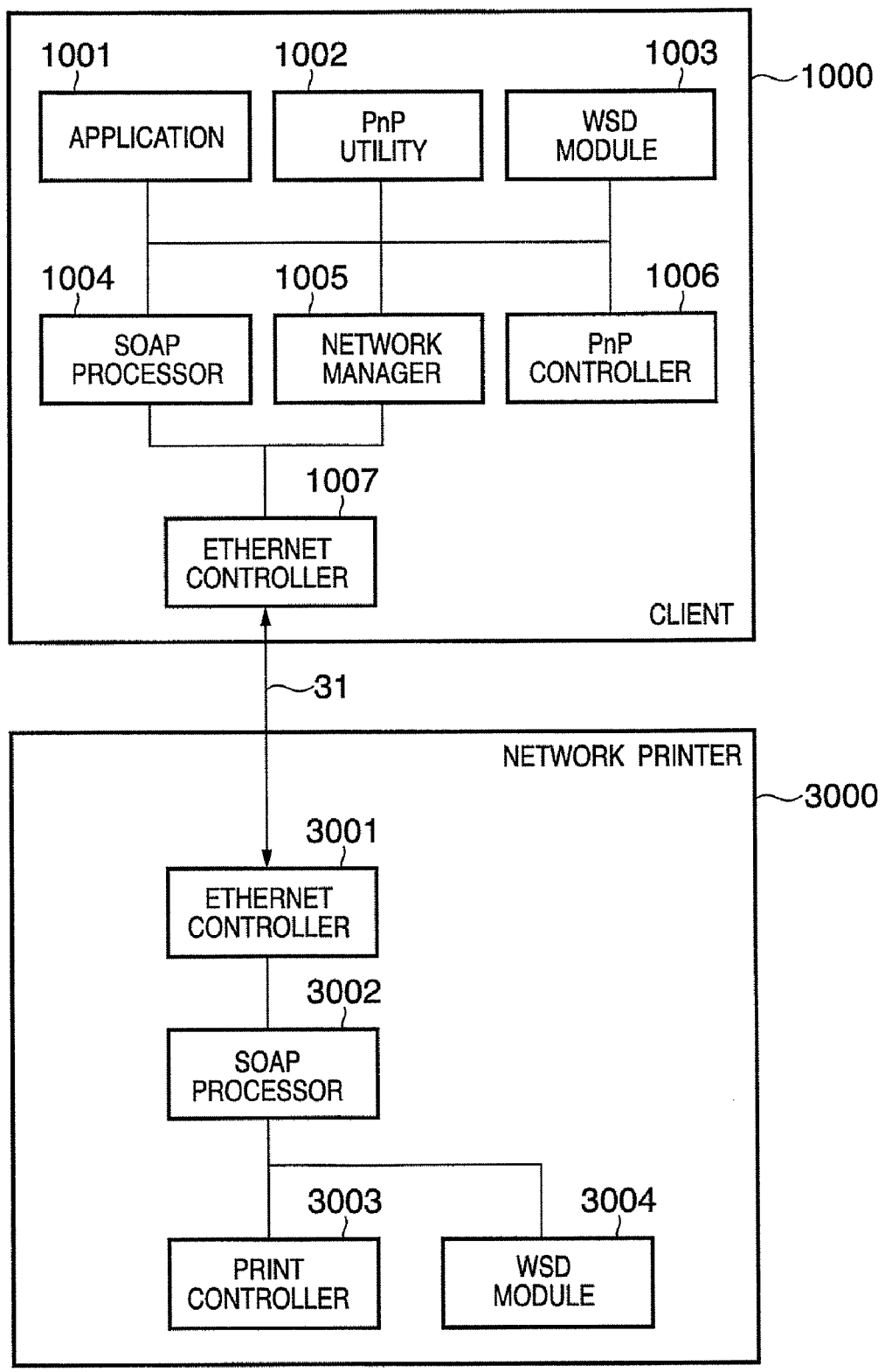
FIG. 2 is a block diagram for explaining modules associated with the network connection between the client and network printer.

FIG. 2 is a functional block diagram for explaining modules associated with the network connection in the computer main body 2000 of the client 1000 and the printer controller 4000 of the network printer 3000 shown in FIG. 1.

The client 1000 is compliant to Ethernet® as a communication function, and is controlled by an Ethernet® controller 1007. Note that the communication function adopts Ethernet®, but may adopt other functions such as WiFi® (IEEE80.11a/b/g), BlueTooth®, and the like. The client 1000 comprises a Simple Object Access Protocol (SOAP) processor 1004 as an upper layer of the Ethernet® controller. A plug-and-play (PnP) utility 1002, WSD module 1003, application 1001, and the like implement two-way communications of data described in extensible Markup Language (XML) via the processor.

A network manager 1005 manages the Ethernet® controller 1007, and comprises a function of acquiring setting information and information associated with communication status. The plug-and-play (PnP) utility 1002 controls the network manager 1005, and has a function of acquiring currently active Ethernet® controller function and its setting information, and recording them on the memory (RAM) 2. The PnP utility 1002 controls a plug-and-play setting UI, and records its setting contents on the memory 2. The PnP utility 1002 converts these pieces of setting information into XML (extensible Markup Language) data, and records them on the memory 2 in the XML format.

The WSD module 1003 executes response processing to a Hello message sent from a network device based on the WS-Discovery specification via the SOAP processor 1004. Also, the WSD module 1003 executes issuance processing of a Probe message for network device search. The WS-Discovery specification is a standard, the development of the specification of which is promoted by Microsoft Corporation, Inc. et al. The WSD module 1003 issues a GetMetadata message based on the WS-MetadataExchange specification. By receiving a response message (Metadata for Device) sent by a device in response to the GetMetadata message, the WSD module 1003 acquires configuration information of the network device. The GetMetadata message includes device configuration information.

If a network device is discovered by these message processes, the WSD module 1003 notifies a PnP controller 1006 of the configuration information of the discovered network device. The PnP controller 1006 has a function of loading a relevant driver and utility software from the hard disk 11 or memory 2 based on the notified configuration information, and installing them in the client 1000. Alternatively, when a software management server used to manage software such as drivers and the like is connected to the network, programs such as drivers and the like may be loaded from that software management server.

The application 1001 is, for example, a document processing application or the like. The application 1001 can print edited document data using a printer as a network device. In this case, the application 1001 transmits print job data to the network printer 3000 via the driver and utility installed by the PnP controller 1006.

On the other hand, the network printer 3000 also comprises an Ethernet® compatible communication function. An Ethernet® controller 3001 controls the communication function. The network printer 3000 comprises a Simple Object Access Protocol (SOAP) processor 3002 as an upper layer of the Ethernet® controller 3001. A WSD module 3004 and print controller 3003 implement two-way communications of data described in extensible Markup Language (XML) via the SOAP processor 3002.

Note that the WSD module 3004 executes transmission processing of a Hello message via the SOAP processor 3002 when the network device 3000 is connected to the network. Also, the WSD module 3004 executes response processing to a Probe message issued by the client 1000. The Hello message and Probe message are those based on the WS-Discovery specification, the development of which is promoted by Microsoft Corporation, Inc. et al.

The WSD module 3004 returns configuration information (a Metadata for Device message) of the network printer 3000 in response to a GetMetadata message issued by the client 1000. This message exchange is based on the WS-MetadataExchange specification, the development of which is also promoted by Microsoft Corporation, Inc. et al.

Network Environment

Figure 3:
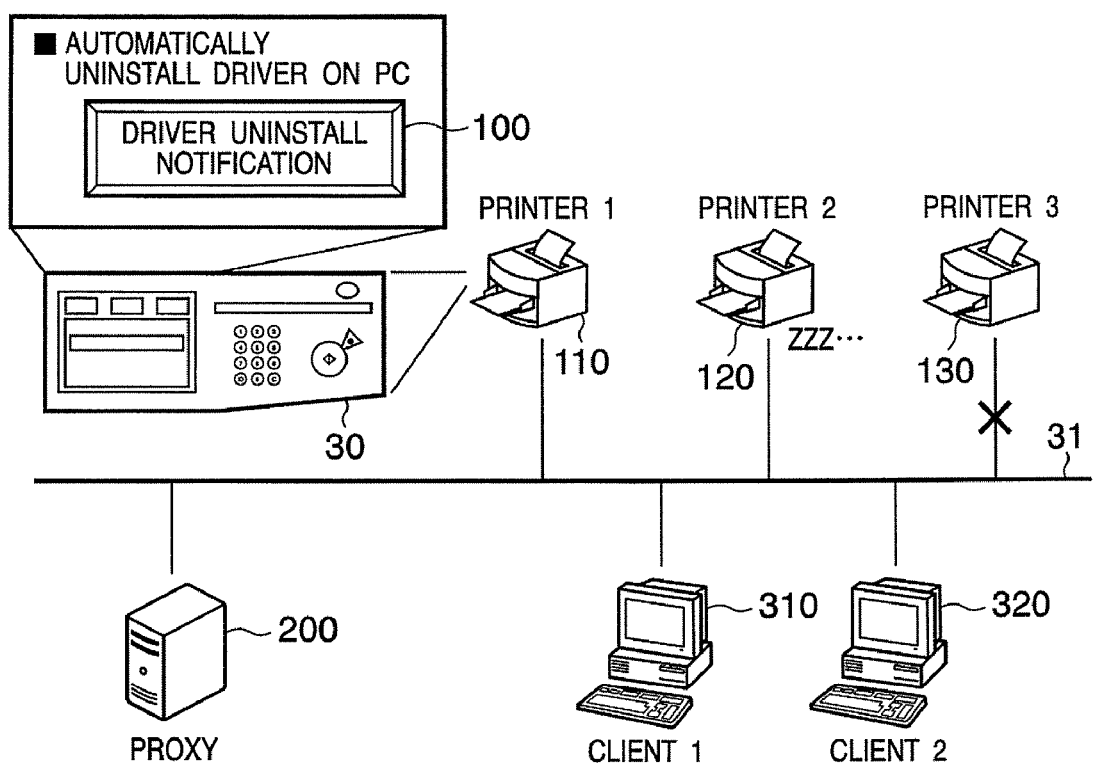
FIG. 3 is a diagram simply showing a network environment in the embodiment of the present invention.

FIG. 3 is a diagram showing a simple network environment in the first embodiment. A printer-1 110, printer-2 120, and printer-3 130 respectively indicate the network printer 3000 shown in FIGS. 1 and 2, and a client-1 310 and client-2 320 respectively indicate the client 1000 shown in FIGS. 1 and 2. As shown in FIG. 3, in this environment, these devices are connected on the network, and a DiscoveryProxy 200 in WSD is also connected. In the first embodiment, no explanation will be especially given about the DiscoveryProxy 200. The second embodiment to be described later will explain a configuration using the DiscoveryProxy 200.

At the same time, FIG. 3 shows a control panel 30 of the printer-1 110, which includes a "driver uninstall notification" button 100 with an indication "automatically uninstall driver on PC" on its UI (user interface) screen. An administrator who manages network printers discards the printer-1 110 or moves it to another network. As a result, if the administrator determines that the printer-1 110 will never be connected to this environment again, he or she presses this "driver uninstall notification" button 100, and then shuts down the printer. Note that it is desirably not so easy to press the "driver uninstall notification" button 100 (e.g., this button may appear when the device is in a service person mode). Pressing of the "driver uninstall notification" button 100 corresponds to the aforementioned instruction to separate and remove that printer 3000 from the network 31, i.e., the instruction to permanently disconnect it.

Also, FIG. 3 shows that the printer-2 120 is now in a sleep state to suppress consumption power, and the printer-3 130 is disconnected from the network connection for some reason.

Overview of WSD Operation

Figure 14A:
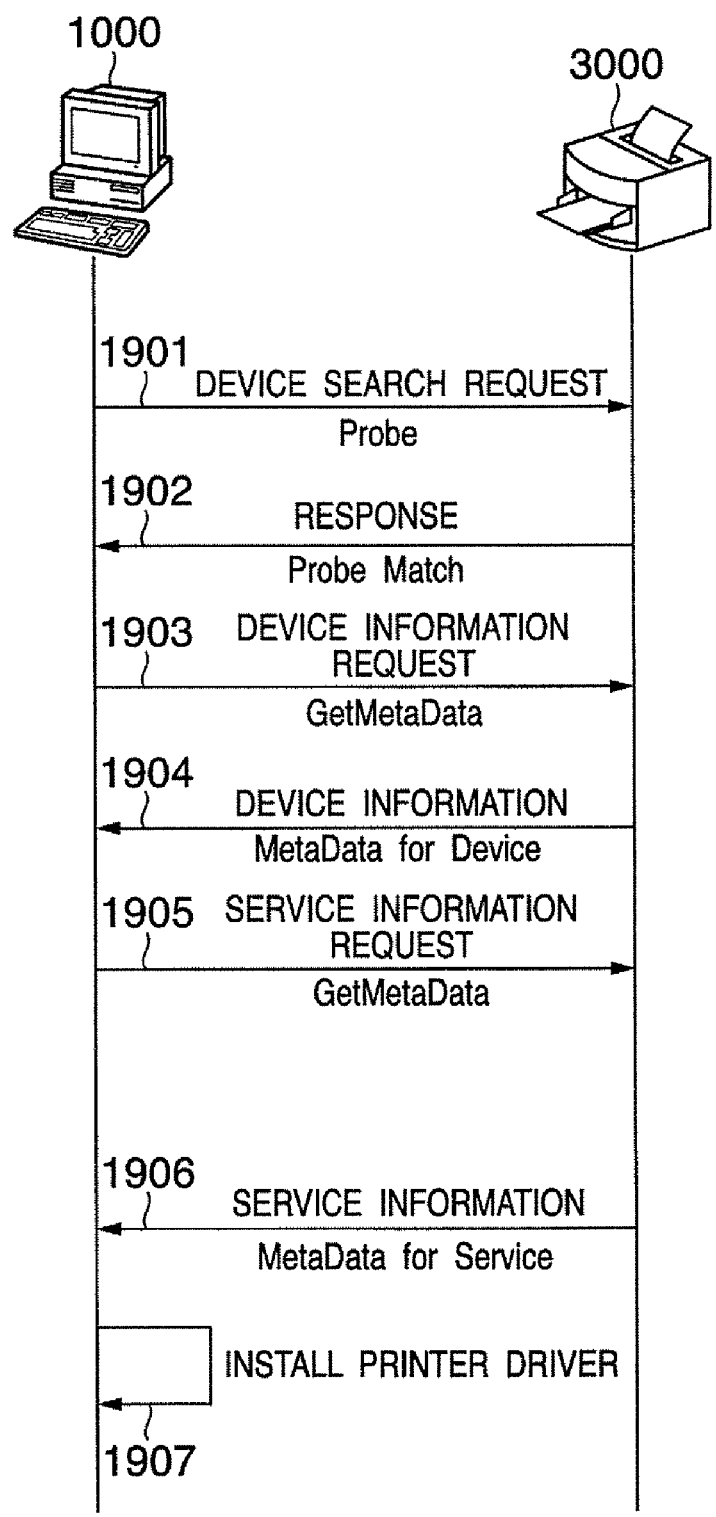
FIGS. 14A and 14B are sequence charts of WS-Discovery.
Figure 14B:
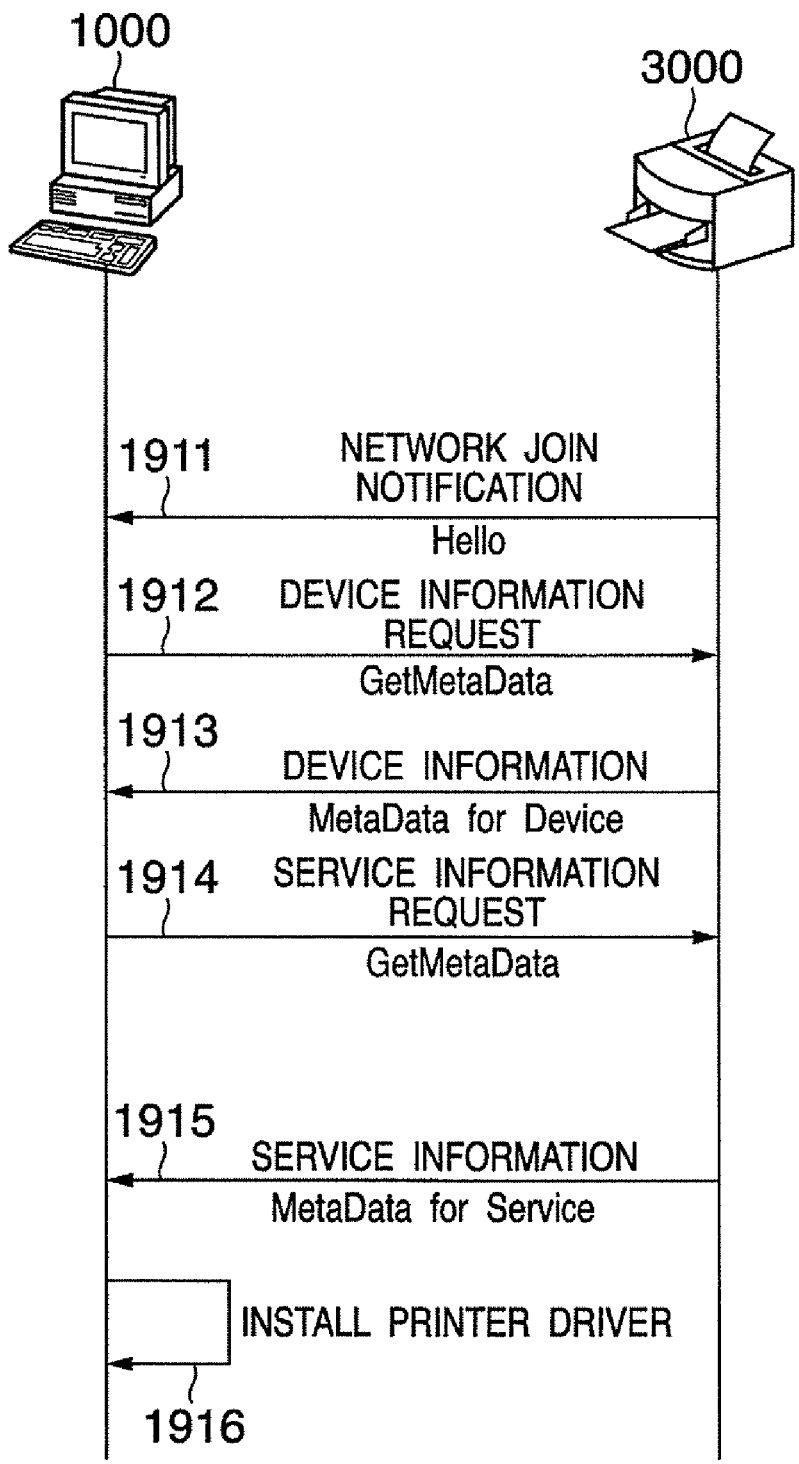

FIGS. 14A and 14B are charts showing the device installation sequences according to WS-Discovery and WS-Metadata by the client computer 1000 and network printer 3000, which are connected to the network 31.

FIG. 14A shows an example of a search sequence to have, e.g., an operation or the like at the client computer as a trigger. For example, Windows® provides a function "add printer" to the user. When the user executes that function, the sequence shown in FIG. 14A is executed. The client computer 1000 sends a device search request (Probe) message 1901 to the printer 3000. The device search request message 1901 is broadcasted to the entire network 31. The device search request message 1901 is described in XML, and includes information indicating that this message is a device search request message, and the device type of a search target in addition to the definition of a nominal space for WS-Discovery, and the like. In this example, since the device type of a search target is a printer, a type tag defined by WS-Discovery describes "PrintBasic". This message includes the information indicating a message type, and the same applies to messages to be described later.

Upon reception of the device search request message 1901, a device checks the message type. If the message type indicates the device search request message 1901, the device reads the device type of a search target from the message, and checks if the read device type matches its own device type. The device attains this checking processing by comparing device type information stored in device configuration information 2901 with the device type of a search target included in the device search request message. If the two device types match, the device of interest is a search target device. Therefore, the device type information stored in the device configuration information is desirably stored in the same format as the type in the device search request message.

If the device determines that the device itself is a search target device of the search request message, it sends a response (Probe Match) message 1902 to the client computer 1000. The response message 1902 includes the address (e.g., IP address) of the responding device.

The client 1000 sends a device information request (GetMetaData) message 1903 to the device which sent the response message 1902. The device information request message 1903 is a message used to acquire designated information by accessing the configuration information database of the device. In this embodiment, the client requests the device to send data of items indicating the configuration information of the device such as the use frequency, print speed, presence/absence of a color print function, highest resolution, presence/absence of a double-sided printing function, manufacturer, and the like of the device.

Upon reception of the device information request message 1903, the device 3000 reads the contents of the requested items from its configuration information database. The device 3000 sends a device information (MetaData for Device) message 1904 including the information indicating the read contents of the items to the client 1000.

Upon reception of the device information message 1904, the client 1000 sends a service information request (GetMetaData) message 1905 to the device. The service information request (GetMetaData) message 1905 is a message used to acquire service information indicating services that the device at the destination can provide from the configuration information database.

Upon reception of the service information request message 1905, the device reads service information from the configuration information database, and sends a service information (MetaData for Service) message 1906 written with the service information to the client 1000.

Upon reception of the service information message 1906, the client 1000 installs a device driver corresponding to the service information in itself based on the service information included in the message (1907). If a driver file database of the client 1000 includes the device driver corresponding to the service information, the client 1000 reads and installs that driver from the database. If the driver file database of the client 1000 does not include that device driver, the client 1000 downloads a driver file from, e.g., a software management server connected to the network, and installs the downloaded driver. The device driver corresponding to the service information can be specified based on directory information that associates a device driver file name (including information indicating the location of the file) with the service information. The client acquires the device driver file name corresponding to the received service information with reference to that directory information. The client reads a device driver file indicated by the acquired file name, and installs it. Note that the client 1000 or software management server holds and manages the directory information.

The device driver installed in this way is registered in the installed device list 1600 shown in FIG. 16. Information to be registered includes a device name (identification name) 1601, IP address 1602, driver name (driver file name) 1603, uninstaller name 1604, icon file name 1605, additional information 1606, and the like. This information can specify the name, address, and driver name of the device whose driver is installed. Also, this information can specify an icon file used to display that device on the client computer. As described above, the registry can substitute the installed device list 1600 shown in FIG. 16.

On the other hand, FIG. 14B shows an example of the search sequence which has an addition operation of a network device as a trigger (e.g., a network device such as a printer or the like is connected to the network and its power switch is turned on). When the device is connected to the network, the Ethernet® controller 3001 recognizes the device connection to the network. In response to that operation as a trigger, the printer 3000 sends a network entry notification (Hello) message 1911 to the client computer 1000. The network entry notification is a notification of connection to network. The network entry notification message 1911 includes at least address information indicating the location of the source device 3000 of that message.

Upon reception of the network entry notification message 1911, the client 1000 checks if the device driver of the source device is installed. If the device driver is installed, the client 1000 executes icon change processing as needed, as will be described later with reference to FIG. 7. If the device driver is not installed, the client 1000 sends a device information request (GetMetaData) message 1912 to the source device of the message 1911. The device information request message 1912 has the same contents as the device information request message 1903.

Upon reception of the device information request message 1912, the device 300 reads the contents of requested items from the database. The device 3000 sends a device information (MetaData for Device) message 1913 including information indicating the read contents of the items to the client 1000.

Upon reception of the device information message 1913, the client 1000 sends a service information request (GetMetaData) message 1914 to the device 3000. The service information request (GetMetaData) message 1914 has the same contents as the service information request message 1905.

Upon reception of the service information request (GetMetaData) message 1914, the device 3000 reads service information from the configuration information database 2901, and sends a service information (MetaData for Service) message 1915 written with the service information to the client 1000.

Upon reception of the service information message 1915, the client 1000 installs a device driver corresponding to the service information in itself based on the service information included in the message (1916). The client performs this process in the same manner as in the installation process 1907 in FIG. 14A. As for the device whose device driver is installed, information associated with that device driver is registered in the installed device table 1600 as in FIG. 14A.

The installation sequence of the device driver compliant to WS-Discovery has been described.

Leave Device From Network

As described above, the network plug-and-play function is implemented. In this embodiment, when a device (especially, the printer) goes offline, it issues a message (Bye request) indicating leaving according to a reason for offline to the client computer. Upon reception of the message, the client performs uninstallation of a device driver or display state change processing according to the contents of the message. This processing will be described in detail below.

FIG. 4A shows the types of the Bye request when the Bye request in WSD is classified and used in the embodiment of the present invention. In FIG. 4A, the Bye request is classified into four types: "Bye request", "Bye request upon sleep", "Bye request upon trouble", and "last Bye request". FIG. 4A shows the use timings of the requests, and additional information to the Bye requests (described in XML).

FIG. 4B shows an example of the format of a Bye request message. A Bye message has fields of a source address 1511, destination address 1512, predetermined message ID 1513 indicating a Bye request, type 1514 indicating one of the four types shown in FIG. 4A, and additional information 1515. The client searches the installed device list 1600 for the source address 1511 to determine if the driver of the device of the source of the Bye message is installed. Since the type field 1514 includes a value indicating one of the aforementioned four types, the client can determine the type of a Bye request based on that value. This message is stored in the RAM 2 in the client that received the message, and is referred to for the above determination. That is, when a peripheral device leaves from the network because of transition to a pause state, the device sends a Bye request (leaving message) including a pause notification indicating that the device state transits to a pause state. When the device leaves from the network due to occurrence of a trouble, it sends a leaving message including a trouble occurrence notification indicating that a trouble has occurred. Note that the Bye request is synonymous with the leaving message.

Issue Bye Request by Device

Sending of a Bye request by the printer and Bye request processing by the client computer will be described below using the flowcharts.

Figure 5:
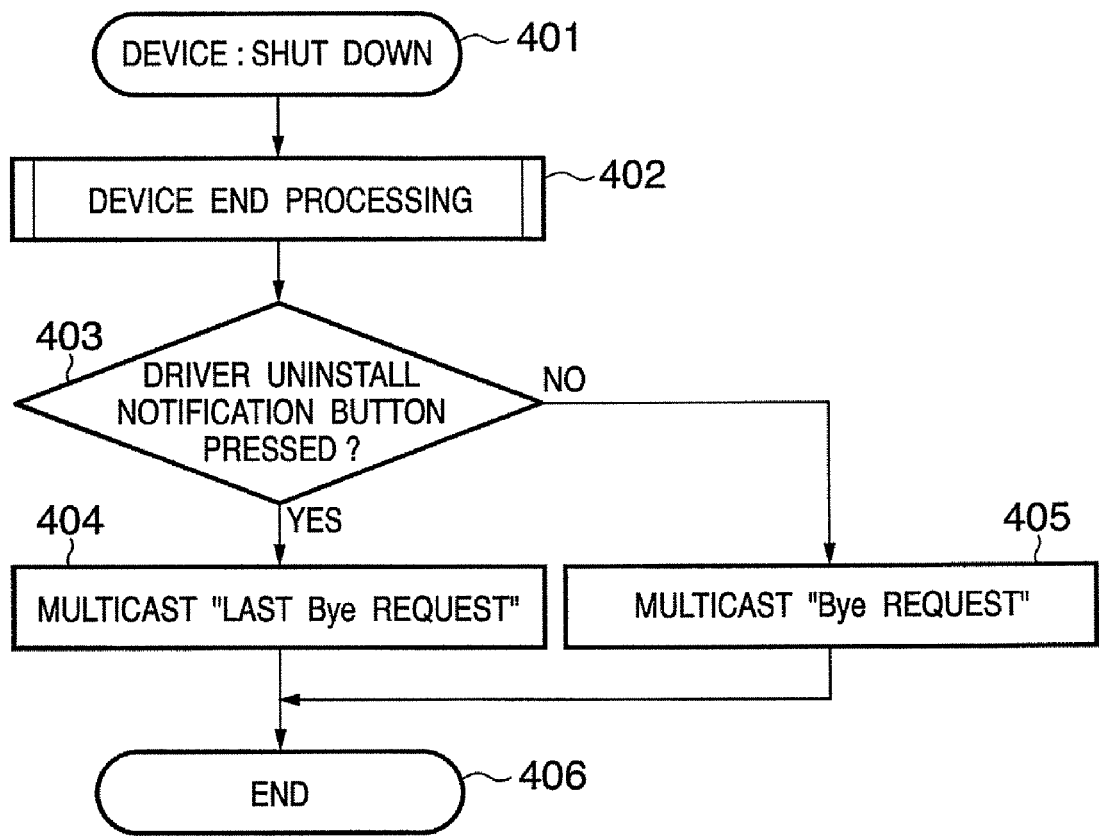
FIG. 5 is a flowchart showing an operation example upon shutting down a device.

FIG. 5 shows an operation upon shutting down the device. The CPU 21 of the printer executes this processing. Upon detection of a device shutdown instruction, the device executes predetermined device end processing first (402). The device end processing stores the current device settings in the hard disk 29, and applies a hardware end procedure to the print mechanism unit 28. The shutdown instruction can be issued upon operation of a power supply button or the like by the user. In addition, termination of a timer used to transit to a sleep state, occurrence of a fatal trouble, and the like are considered as the shutdown instruction, and the processing in FIG. 5 is executed.

After that, the device checks if the user pressed the "driver uninstall notification" button 100 described previously using FIG. 3 (403). If the user pressed the "driver uninstall notification" button 100, the device records information indicating pressing of the "driver uninstall notification" button 100 in a predetermined area (to be referred to as an uninstall notification flag hereinafter) assured on the RAM 22. Therefore, the device checks in step 403 with reference to that flag of the RAM 22 if the user pressed "driver uninstall notification" button 100.

If the user pressed the "driver uninstall notification" button 100, the device issues a "last Bye request" described using FIGS. 4A and 4B by multicast (404). The destination of the Bye request message is the client computer, i.e., host. The destination address field records a multicast address that designates the host. The source address is the address of that printer. Since the type of the Bye request is indicated by the type field 1514, the device writes the value corresponding to the "last Bye request" in the type field 1514 in this Bye request message. That is, the device can communicate with the computer, and has an input button used to input an operator's instruction. When the operator inputs an uninstall instruction of a device driver corresponding to the peripheral device, the device sends a Bye request (leaving message) including information indicating that the device driver corresponding to that peripheral device is to be uninstalled. On the other hand, in step 403 the device refers to the uninstall notification flag. If the device determines that the user did not press the "driver uninstall notification" button 100 (403-No), it sends a normal "Bye request" onto the network by multicast (405) and shuts off the device power supply (406). The normal Bye request includes Bye requests other than the last Bye request. As shown in FIG. 4A, the normal Bye request has variations such as transition to a sleep state, a device trouble, and the like. Hence, in step 405 the device writes the value corresponding to the type of a Bye request according to a cause of offline in the type field 1514 of the Bye request message. If the device receives the cause of offline as a parameter upon branching to the processing in FIG. 5, it can immediately determine it based on the parameter. The device writes additional information according to the cause of offline in the additional information field 1515 of the Bye request message. The additional information can be recorded in the ROM 23 in advance in association with the value indicating the Bye type.

With the above procedure, the printer 3000 sends a Bye message based on the reason for offline to all client computers. The Bye request message includes the type and additional information. Each client that received the Bye request can determine the cause of offline of that printer based on the type and additional information.

Bye Request Processing by Client

Figure 6:
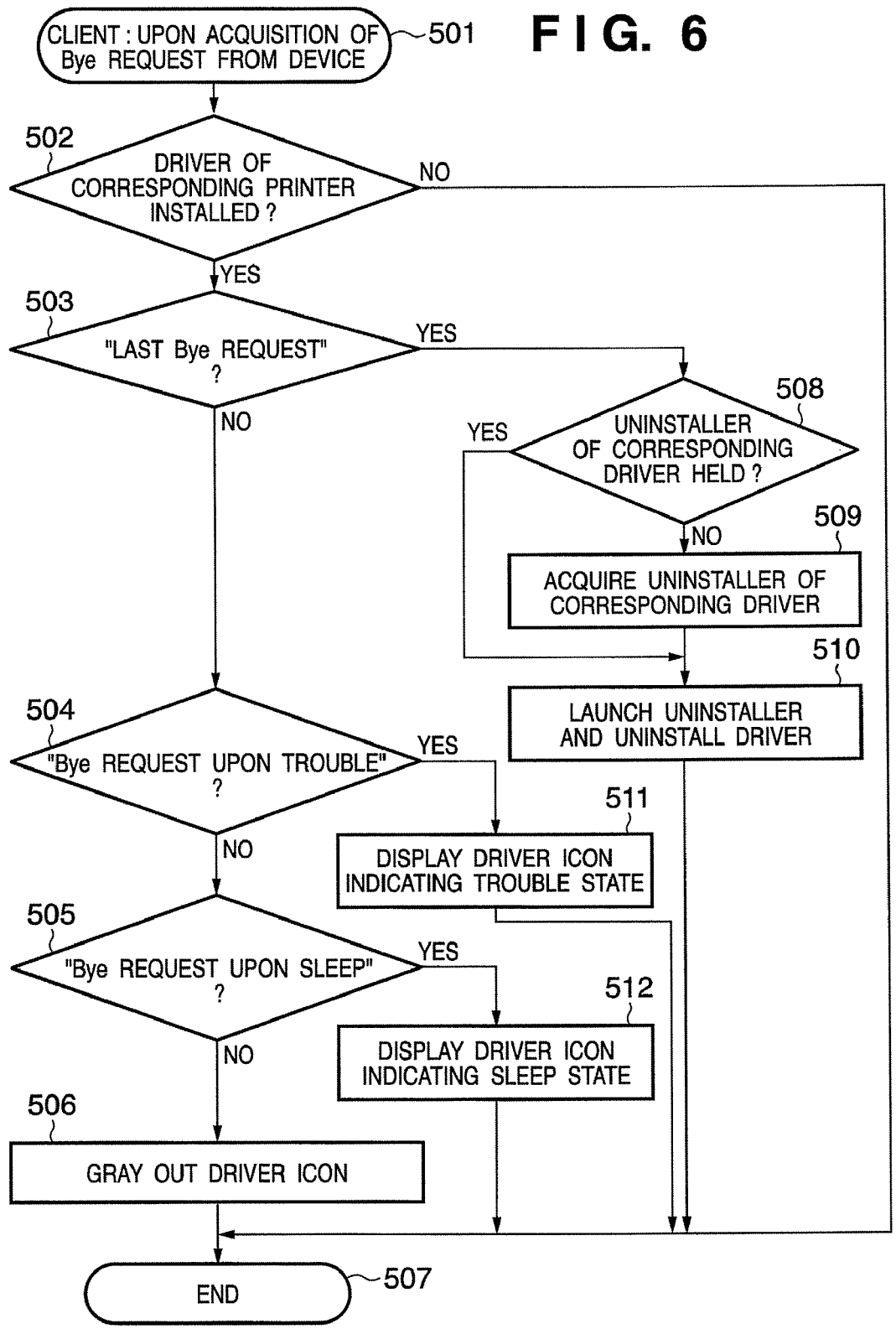
FIG. 6 is a flowchart showing an operation example executed when the client receives a Bye request.

FIG. 6 is a flowchart executed when the client 1000 receives a Bye request from the device. The CPU 1 of the client 1000 executes this procedure. As shown in FIGS. 4A and 4B, the Bye request from the device is classified into the four types to take correspondence depending on situations. That is, the client 1000 stores a program executed by a computer which can communicate with a peripheral device that issues a message including status information.

Upon reception of the Bye request from the network printer, the client 1000 checks if the driver of the corresponding printer, i.e., the printer as the source of the Bye request is installed in itself (502). That is, the processing in step 502 is executed by receiving the leaving message from the peripheral device. For example, the client searches the installed device list 1600 for the IP address field 1602 having the same address as that in the source address field 1511 shown in FIG. 4A. If that address is found, the client can determine that the driver is installed; otherwise, can determine that the driver is not installed.

If the driver is not installed, since the Bye request has no significance, the operation ends. If the client 1000 determines in step 502 that the driver is installed, it checks if the received Bye request is a "last Bye request" (503). That is, the client 1000 analyzes the leaving message received from the peripheral device. The client can determine the type of the Bye request with reference to the type field 1514 of the Bye request message. If the received Bye request is the "last Bye request", the client 1000 checks if it holds an uninstaller of the corresponding driver (508). The uninstaller of the driver is a program created to uninstall the driver without troubling the user. The uninstaller is often saved at a predetermined or designated location upon installation. Hence, the uninstaller program file name and its location (path or the like) are registered in the uninstaller name field 1604 of the installed device list 1600 in FIG. 16 in association with the device. If no uninstaller is available, this field is blank. In step 508, the client checks the contents of the uninstaller name field 1604. If this field is not blank, the client determines that the uninstaller is held. Note that the file name and location of the uninstaller may be registered in the registry, and the presence/absence of the uninstaller may be determined with reference to the registry.

If the uninstaller is not held, the client 1000 acquires the uninstaller of the corresponding driver by searching the network (509). The client may search servers on a local area network, or may search the Internet. The client 1000 launches that uninstaller to automatically uninstall the corresponding printer driver (510). If the client 1000 determines that the information included in the leaving message is an uninstall notification to uninstall a device driver corresponding to the peripheral device as the source of the leaving message, it uninstalls the driver program corresponding to the peripheral device as the source of the leaving message.

On the other hand, if the client 1000 determines in step 504 that the Bye request is a "Bye request upon trouble", it stores the type of the Bye message in the memory 2. For example, the client rewrites a variable indicating the printer status to a value indicating "trouble". In this manner, the operating system can use an icon corresponding to the trouble. The same applies to other types of Bye messages. In this way, the client 1000 can display an icon for trouble indication, which is prepared in advance, in accordance with the type of the Bye message, upon displaying the driver icon (511). Alternatively, an icon file name of an icon indicating a trouble state may be registered in the icon file name field 1605 of the installed device list shown in FIG. 16. In such case, a file registered in the icon file name field 1605 is used as a device icon. Also, the client copies the additional information 1515 (average resume time, trouble status, and the like) of the Bye request message to the additional information field 1606 of the installed device list 1600. That is, the Bye request (leaving message) includes additional information associated with the peripheral device as the source of the leaving message. If the leaving message includes information indicating a pause state, it includes information associated with a resume time of the peripheral device as the source of the leaving message as additional information. If the leaving message includes information indicating a trouble state, it includes a trouble state of the peripheral device as the source of the leaving message as additional information. The client 1000 switches and displays an icon (image) based on these pieces of additional information. If the client 1000 determines as a result of analysis that the information included in the received Bye request (leaving message) indicates a trouble state, it switches and displays an image corresponding to the peripheral device that issued the leaving message to that corresponding to the trouble state. That is, if the client 1000 determines as a result of analysis that the information included in the Bye request (leaving message) is information different from an uninstall notification, it switches and displays an image corresponding to the peripheral device that issued the leaving message to that corresponding to the information included in the leaving message.

Likewise, if the client 1000 determines in step 505 that the Bye request is a "Bye request upon sleep", it stores the type of the Bye message in the memory 2. Upon displaying a driver icon, the client 1000 displays the driver icon indicating a sleep state in accordance with the type of the Bye message (512). Alternatively, an icon file name of an icon indicating a sleep state may be registered in the icon file name field 1605. That is, if the client 1000 determines as a result of analysis that information included in the received Bye request (leaving message) indicates a pause state, it switches and displays an image corresponding to the peripheral device that issued the leaving message to that corresponding to the pause state. The client copies the additional information 1515 of the Bye request message to the additional information field 1606 of the installed device list 1600. The additional information is displayed together with the icon.

Figure 8:
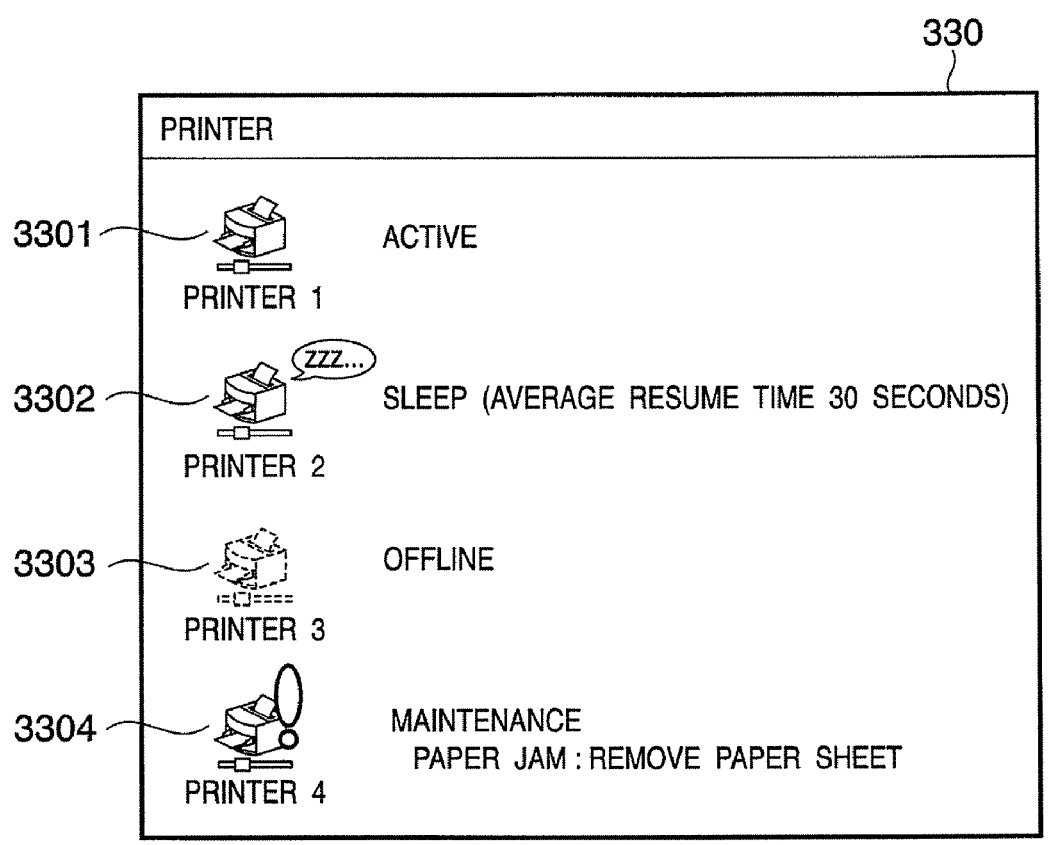
FIG. 8 shows an example of a UI of driver icons at the client.

If the client determines that the received Bye request corresponds to none of the above Bye requests, i.e., it is a normal "Bye request", it stores the type of the Bye message in the memory 2. Upon displaying a driver icon, the client grays out the driver icon according to the type of the Bye message (506). FIG. 8 simply illustrates display examples of these icons. Icons 3301 to 3304 are displayed in accordance with the types of Bye request messages. Character strings as additional information are displayed together with the icons.

Processing of Hello Request

Figure 7:
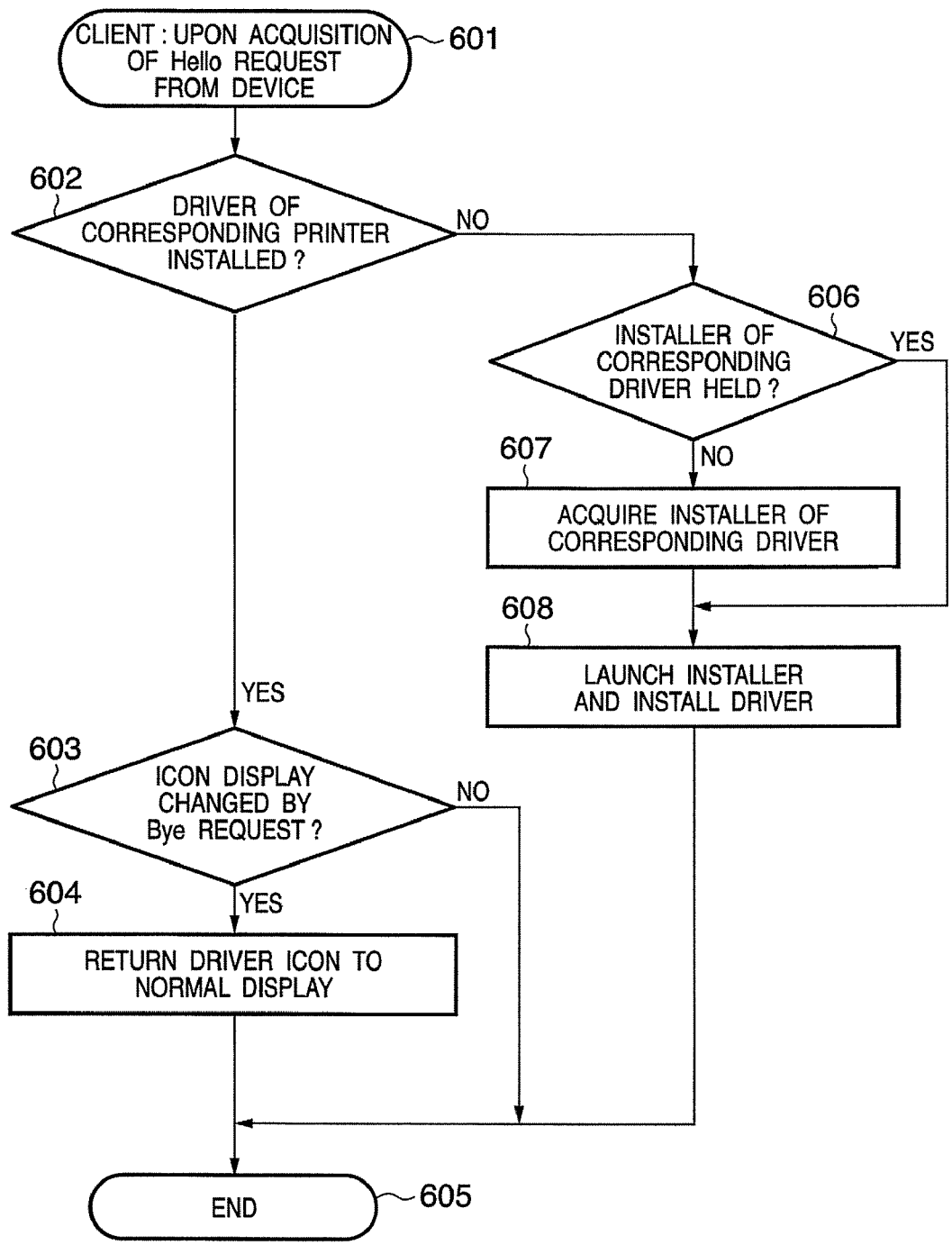
FIG. 7 is a flowchart showing an operation example executed when the client receives a Hello request.

FIG. 7 is a flowchart executed when the client 1000 receives a Hello request message from the network printer. In this embodiment, the Hello request is not classified unlike the Bye request, but it may be similarly classified and implemented. The CPU 1 of the client 1000 in FIG. 14B processes the processing shown in FIG. 7. In FIG. 7, the acquisition procedures of the device information and service information executed upon installation are omitted.

Upon reception of a Hello request from the network printer, the client 1000 checks if a driver of the corresponding printer is installed (602). The client can execute this checking process with reference to the installed driver list 1600 or the registry. If the driver of the corresponding printer is not installed, the client checks if an installer of the corresponding driver is held according to the network PnP operation (606). If the installer is not held, the client acquires the installer by searching the network and the like (607). The client executes the installer of the corresponding driver to automatically install the driver of the network printer that issued the Hello request (608).

On the other hand, if the driver of the network printer as the source of the Hello request has already been installed on the client 1000, the client checks if icon display is currently changed by the Bye request (603). When the icon name is registered in the icon name field 1605 of the installed device list 1600, the client can execute this checking process based on this name. When the type of the Bye request is stored, the client can determine the type of the received Bye request with reference to its storage location.

If icon display is not changed, that printer is continuously usable. Hence, the process ends without any process. If the driver icon has already been changed by the Bye request, since the client can confirm that the printer is usable from now on due to reception of the Hello request, it returns the driver icon to that indicating a normal state (604). In this case, the client executes operations opposite to those made in, e.g., steps 506, 511, and 512 in FIG. 6. For example, if the icon name is registered in the icon name field 1605, the client deletes that icon name. If the variable indicating the printer status is changed, the client returns that value to a value indicating "normal".

In this way, upon reception of the Hello request from the network printer, the client 1000 is automatically set in a state in which it can use the printer.

FIG. 8 shows the states of driver icons on the client 1000. The client displays the icons to indicate that the printer-1 110 is active, the printer-2 120 is sleeping, the printer-3 130 is offline, and a printer-4 is in a trouble state. In addition, the client presents additional information such as an average resume time, and the like in correspondence with the printer in the sleep state and that in the trouble state.

Figure 9:
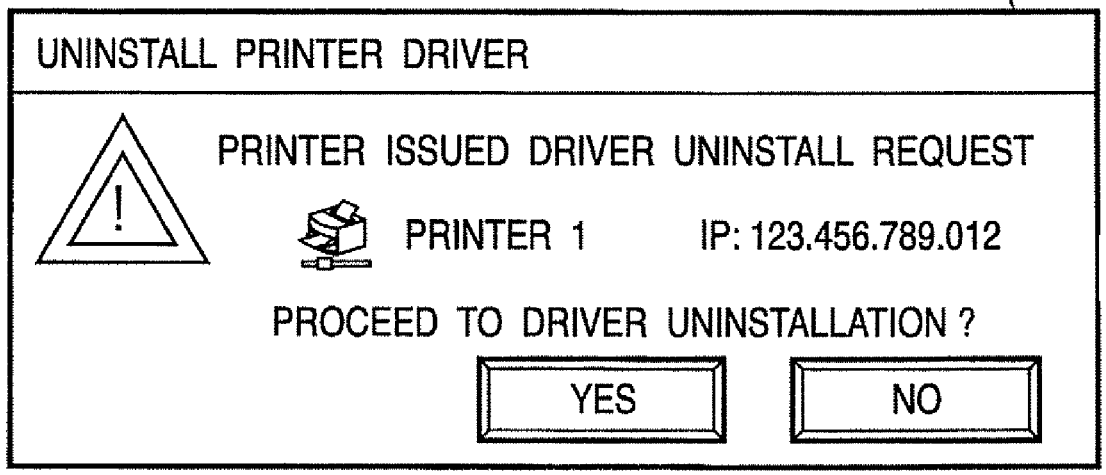
FIG. 9 shows an example of a UI at the client that asks the user whether a driver is to be uninstalled.

A UI 340 shown in FIG. 9 confirms the user if the driver can be automatically uninstalled. The client 1000 displays this UI before execution of uninstallation in step 509 in FIG. 6 when the printer issues the "last Bye request" to the client 1000. Normally, a "last Bye request" is not issued, and it is desirable to automatically uninstall the driver without displaying this UI, so as to improve convenience. That is, when the client 1000 determines as a result of analysis that the information included in the received Bye request is a notification indicating that the peripheral device permanently leaves from the network, it displays the UI window 340 used to input an uninstall instruction of a driver program corresponding to the peripheral device as the source of the Bye request. If the user inputs an uninstall instruction via the UI window, the client uninstalls the driver program corresponding to the peripheral device which notified leaving by the final leaving notification.

As described above, the printer of this embodiment sends a Bye message (leaving request) of the type according to a reason for offline to the client. Especially, when the driver is to be uninstalled, the printer sends "last Bye". In response to a Hello message (network entry request) from the printer, the client installs its driver. If the driver has already been installed, the client returns its status information to a value indicating a normal state. If the type of the Bye message from the printer is "last Bye" (permanent leaving request), the client uninstalls the driver. Upon reception of the Bye messages of other types, the client changes information indicating printer status according to the type. The client displays the icon of the printer in correspondence with the status information. The leaving message received in this embodiment is information indicating that a peripheral device leaves from the network in a predetermined device search system (WSD).

As a result, when the administrator of the printer sends the last Bye message, the driver on the client can be uninstalled. For this reason, an unlimited increase in number of device drivers installed in the client can be prevented.

Second Embodiment

Figure 11:
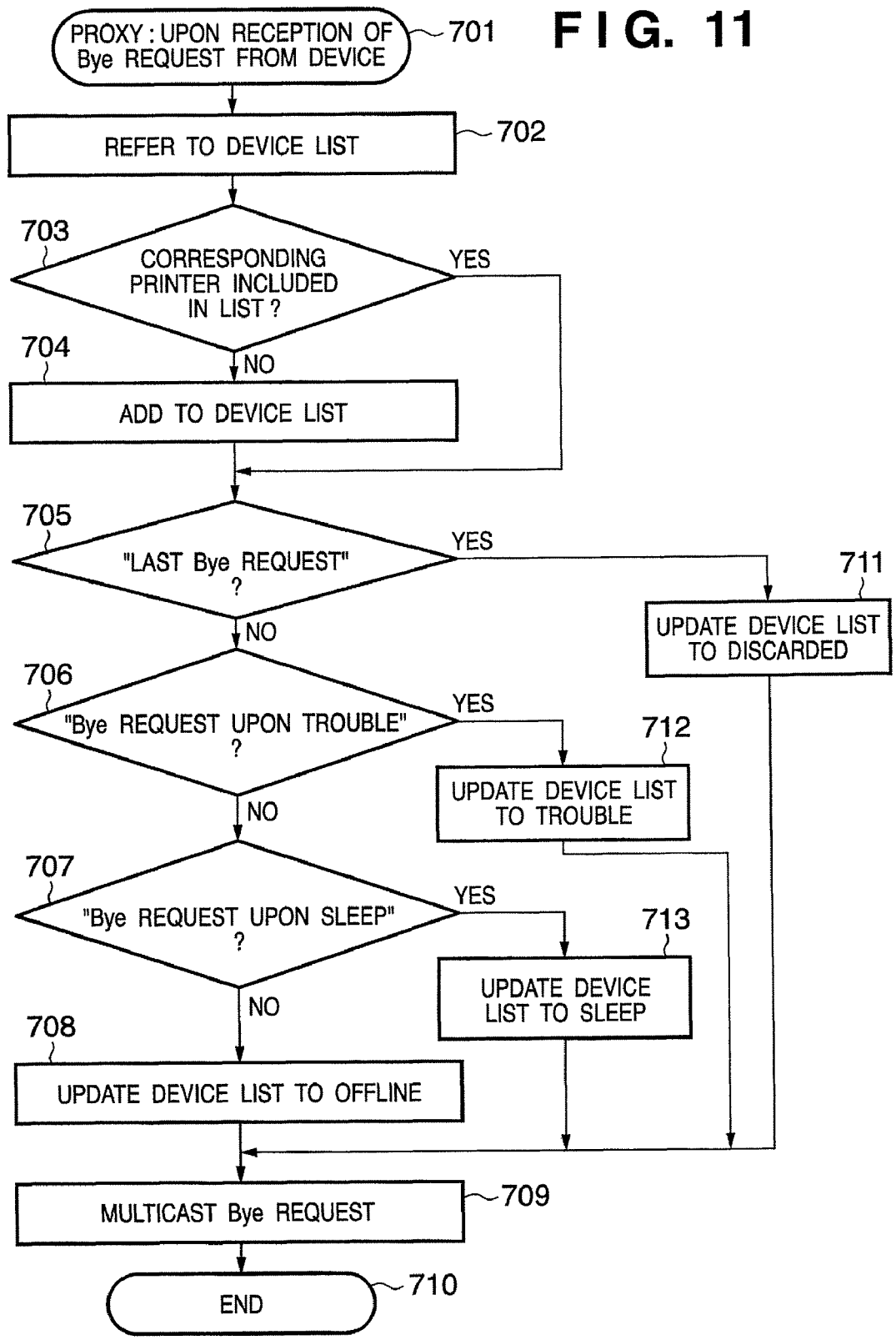
FIG. 11 is a flowchart showing an operation example executed when the proxy receives a Bye request.
Figure 12:
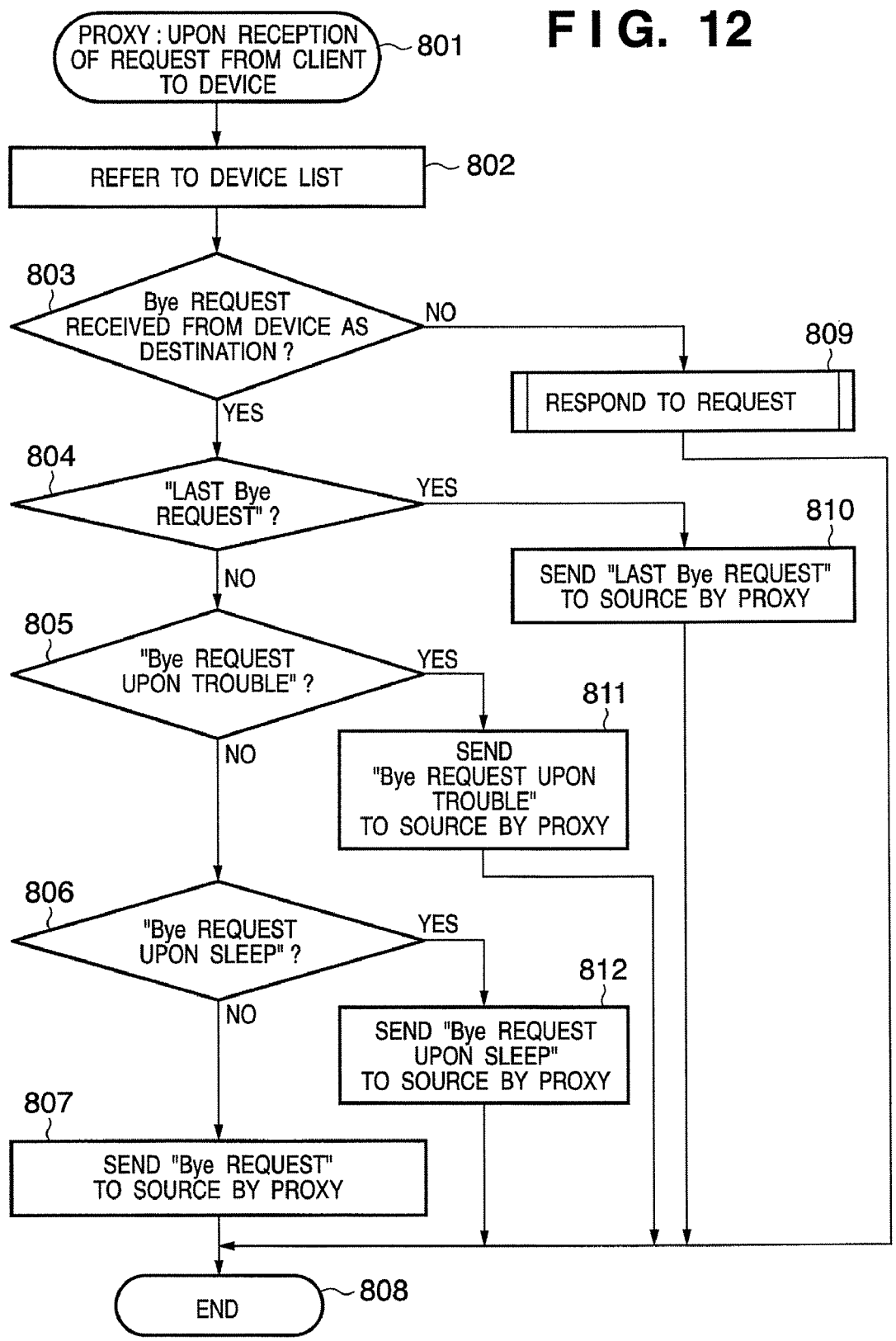
FIG. 12 is a flowchart showing an operation example executed when the proxy receives a request to a device from the client.
Figure 13:
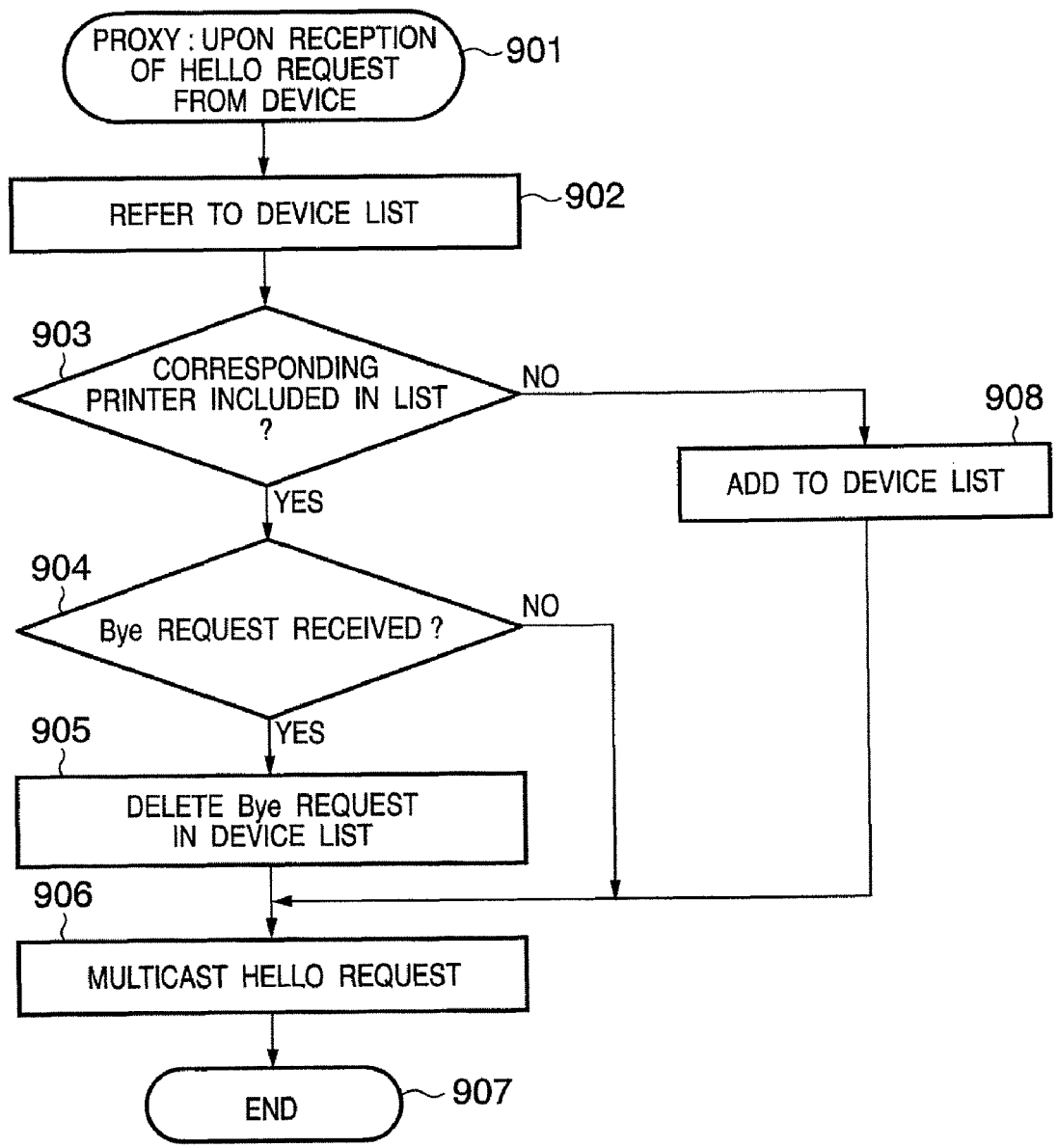
FIG. 13 is a flowchart showing an operation example executed when the proxy receives a Hello request.

As the second embodiment of the present invention, the arrangement and operation when the DiscoveryProxy 200 is connected to the network will be described. FIGS. 11 to 13 are flowcharts of the DiscoveryProxy (to be simply referred to as "proxy" hereinafter) 200 in the embodiment of the present invention when the proxy 200 is connected to the network. FIG. 15A shows an example of the sequence when a device joints the network. FIG. 15B shows an example of the format of a Bye message in this embodiment.

FIG. 15A is nearly the same as FIG. 14B of the first embodiment except that the proxy 200 is interposed between the printer 3000 and client 1000, and relays a Hello request and Bye request. In FIG. 15A, the printer 3000 sends a Hello request 1501 and Bye request 1503 by unicast in place of multicast. Upon receiving these messages, the proxy 200 executes processes shown in FIGS. 11 and 13, respectively. The proxy 200 then sends a Hello request 1502 or Bye request 1504 by multicast to have the client as a destination. At this time, the proxy 200 appends information used to specify printers as the sources of these messages. The proxy 200 receives a request from the client (e.g., a print request), and relays it to the printer. The proxy 200 can use a general-purpose computer as in the client, and has the same arrangement as the client.

FIG. 15B shows an example of the Bye request message 1504 which is sent from the proxy 200 to the client 1000 in this embodiment. The Bye request 1503 is the same as that in the first embodiment. To the format shown in FIG. 4B, a printer ID field 1516 is added. This is because the proxy 200 relays the message, and the source of the message becomes the proxy. Upon reception of the Bye request 1504, the client identifies a printer as the source of the Bye request with reference to the printer ID field 1516. The same applies to the Hello request 1502, and a printer ID is appended.

FIG. 10 shows an example of a device list 1010 held by the proxy 200. The proxy 200 manages network printers connected to the network using such device list 1010, and recognizes the states of respective printers. Reference and update processes of the device list 1010 will be described below using FIGS. 11 to 13. The device list 1010 registers items shown in FIG. 10 in association with each printer as the source of the received Hello request: a device name 1011, model 1012, and IP address 1013. Each of flag fields 1014 to 1017 indicates the state associated with the registered device. The states indicated by the flag fields are registered in accordance with the types of Bye requests, and include four types, i.e., discarded, trouble, sleep, and offline. The device list 1010 is held in a RAM or the like of the proxy 200. The proxy shown in FIGS. 11 to 13 is a server computer which can communicate with a peripheral device that issues a message and a client computer. Note that the proxy has a function of receiving a message including a Bye request from the peripheral device or a use request from the client, and analyzing the message. If it is determined that the analyzed message is a Bye request (leaving message) from the peripheral device, the proxy 200 manages status information corresponding to the peripheral device as the source of the leaving message based on the type of information included in the leaving message.

FIG. 11 is a flowchart executed when the proxy 200 receives a Bye request from the device. Upon reception of the Bye request 1503 from the device, the proxy 200 refers to the device list 1010 managed by itself (702). The proxy 200 checks if the corresponding printer is registered in the device list 1010 (703). More specifically, as shown in FIG. 15B, the Bye information includes the printer ID. Hence, the proxy 200 can attain the process in step 703 by comparing the printer ID included in the Bye information with the device list 1010. If the proxy 200 determines in step 703 that the printer is not registered in the list, it adds that printer to the device list 1010 (704). If the Bye request 1503 includes the printer name and model name (which are not included in FIG. 4A), the proxy registers the printer in the device list 1010 using them. If the Bye request 1503 does not include any printer name and model name, the proxy sends a device information request to the device to acquire device information, and registers that device using the device information.

Next, the proxy 200 checks with reference to the type field 1514 included in the Bye request if the Bye request 1503 is a "last Bye request" (705). If the Bye request 1503 is the "last Bye request", the proxy 200 sets the discarded flag field 1014 (indicated by a "o" mark in FIG. 10) of the device list 1010. In the example of FIG. 10, since the proxy 200 receives a last Bye request including information associated with printer 1 in the device name field, it sets information indicating that printer 1 has been discarded in the discarded flag field of printer 1 in the device name field.

If the proxy 200 determines as a result of analysis that the Bye request 1503 is a "Bye request upon trouble", "Bye request upon sleep", or "Bye request", it updates the contents of the trouble flag field 1015, sleep flag field 1016, or offline flag field 1017 of the device list 1010. These processes correspond to steps 706 to 708, 712, and 713. The proxy sets the flag of each field by updating. In this way, the Bye request 1503 from the device 3000 is stored as a device state in the device list 1010 of the proxy 200. After that, the proxy 200 sends the received Bye request by multicast intact to notify a plurality of clients connected of that request (709). Note that the printer ID field 1516 is added to indicate the source in FIG. 15B. However, if the proxy sends the request by writing the address of the printer 3000 in the source field 1512, the need for the printer ID field 1516 can be obviated.

FIG. 12 is a flowchart executed when the proxy 200 receives some request message (e.g., a print request) to the network printer 3000 from the client 1000. The proxy can determine based on the source address and message type that the received message is a request message from the client 1000. To indicate that the destination of a message is the network printer 3000, a request message from the client to the printer 3000 includes fields indicating the address and ID of the destination printer, as shown in FIG. 15B. The proxy 200 can identify the device as a request destination with reference to the contents of these fields.

Upon reception of a request message from the client, the proxy 200 refers to the device list 1010 (802). The proxy 200 checks if it has already received a Bye request from the device as the request destination (803). For example, if the request message received from the client includes identification information associated with printer 1, the proxy 200 refers to items of printer 1. As a result, since the discarded flag field 1014 of printer 1 is set, the proxy 200 can determine that it has received the Bye request from printer 1. In this case, if at least one of the flag fields 1014 to 1017 of the device list 1010 is set, the proxy can determine that it has received the Bye request. If the Bye request is not received, it is considered that the device is normally operating. Hence, if the proxy 200 determines that it has not received any Bye request from the device as the request destination, it sends the request message received from the client to the device included in that message by unicast. Then, the proxy 200 ends processing by responding to the request from the client (809).

If the proxy 200 determines in step 803 that it has received the Bye request from the device as the request destination, it executes processing according to the contents of the Bye request received from the device. For example, if the "discarded" flag field 1014 is set, the proxy has already received the "last Bye request". In such case, the proxy 200 issues a "last Bye request" to the client as the request source in place of the device. That is, the proxy 200 checks if a state corresponding to a peripheral device, which is included in state information managed by a peripheral device list and is requested by a user request, is a state corresponding to a final leaving notification indicating that the peripheral device permanently leaves from the network. As a result, if the proxy 200 determines that the peripheral device is in the state corresponding to the final leaving notification indicating that the peripheral device permanently leaves from the network, it sends the final leaving notification to the client computer as the request source of the use request in place of the peripheral device. On the other hand, if the proxy determines that the peripheral device is in a state corresponding to a temporary network leaving notification indicating that the peripheral device temporarily leaves from the network, it sends the temporary network leaving notification to the client computer as the request source of the use request. This is because the "last Bye request" may not have arrived the client as the request source. With this processing, the client which cannot receive the "last Bye request" at the time of sending of that request from the device can receive the "last Bye request", and can uninstall the driver. When the device issues one of other Bye requests, the proxy can determine it based on the values of the flag fields 1015 to 1017. In such case, the proxy 200 sends the corresponding Bye request to the client in place of the device (804 to 807, 810 to 812). In the Bye message sent from the proxy 200 to the client, the ID of the printer as a destination of the request sent from the client is written in the printer ID field 1516. This Bye request is the same as the Bye request 1504 in FIG. 15A.

For example, when device A sends a last Bye request since it leaves from the network, the client often does not receive the last Bye request for some reason. In such case, using the processing shown in FIG. 12, in response to a print request from the client by designating device A, the proxy 200 notifies the client of the last Bye request received from device A.

Hence, even when the client cannot directly receive the last Bye request from device A, it receives, from the proxy 2000, the last Bye request sent from device A, and can uninstall the driver corresponding to device A. In this way, appropriate processing can be executed even for a request to an offline device. That is, if the proxy 200 determines as a result of analysis that the received request is a use request message of a peripheral device from the client computer, it checks a state corresponding to the peripheral device whose use is requested by the use request message based on the state information managed by the peripheral device list. If the state information of the peripheral device requested by the use request indicates a state according to the type of information included in a Bye request (leaving message), the proxy sends a notification indicating that the peripheral device leaves from the network to the client computer as the request source of the use request.

FIG. 13 shows the operation of the proxy 200 upon reception of the Hello request 1501 from the device. Upon reception of the Hello request 1501, the proxy 200 refers to the device list 1010 held by itself (902). The proxy checks if the list includes the corresponding printer (903). If the device list 1010 does not include the corresponding printer, since it is considered that the printer is a newly added device, the proxy adds the printer to the device list 1010 (908). The proxy can execute this sequence as in FIG.

On the other if the list 1010 includes the corresponding printer, the proxy checks if it has received a Bye request (904). The proxy can attain this checking process with reference to the device list 1010 as in FIG. 11. If the proxy has received the Bye request, it cancels the Bye request in the device list. That is, the proxy clears the values of all the flag fields 1014 to 1017 of the device list 1010. After that, in order to notify the connected clients of the received Hello request, the proxy sends the same message 1502 by multicast to have hosts as destinations. With this operation, the proxy 200 can manage the states of all the connected printers using the device list. That is, when the proxy 200 manages the state information of a peripheral device as a state indicating the peripheral device permanently leaves from the network, it changes the state information of the peripheral device to a state indicating that the peripheral device is connected upon reception of a network entry notification from the peripheral device.

The operations of the client upon reception of the Hello request and Bye request are the same as those in the first embodiment.

As described above, the proxy can send the network entry request (Hello) or leaving request (Bye) message to the client which cannot receive these messages from the device (printer) 3000 in real time. For this reason, the client can recognize that the device as the request destination is offline immediately after sending the request to that device. Since the client can uninstall the driver of the device which sent the last Bye request when it recognizes that the device as the request destination is offline, an increase in number of unnecessary drivers can be prevented. Note that the proxy 200 transfers messages received from the peripheral devices to the client computers by multicast.

The embodiments of the present invention have been described. However, a practical arrangement is not limited to those of the above embodiments.

Note that some devices have an interface for a wired communication (e.g., a LAN) and that for a wireless communication (e.g., Bluetooth). In this case, the address for the wired communication and that for the wireless communication are assigned to the device. Hence, the device must generate a last bye request depending on the situation. However, in case of such device having a plurality of interfaces, a plurality of different methods of generating a last bye request are available.

The first example corresponds to a case wherein the aforementioned device is to be discarded. In this case, the device must generate a last bye request for the wired interface and that for the wireless interface. The second situation corresponds to a case wherein the wireless interface is likely to be used, but the wired interface will not be used in the future. In this case, the device must generate a last bye request for the wired interface.

The last bye transfer processing in the device having a plurality of interfaces will be described below using FIG. 17. Note that the CPU 21 of the printer 3000 executes the processing shown in FIG. 17.

The printer 3000 checks if it has a plurality of interfaces (S1701). If the printer 3000 determines in step S1701 that it has a plurality of interfaces, it displays a multi-interface UI 1801 shown in FIG. 18 (S1702). Note that details of FIG. 18 will be described later. If the printer 3000 determines in step S1701 that it does not have a plurality of interfaces, it displays a single-interface UI 1901 shown in FIG. 19 (S1706). The single-interface UI 1901 shown in FIG. 19 includes an OK or cancel button. If the user presses the OK button, and the printer 3000 recognizes a driver uninstall instruction (S1707-YES), the printer generates a last bye request including the address held in the ROM 23 (S1708).

Figure 18:
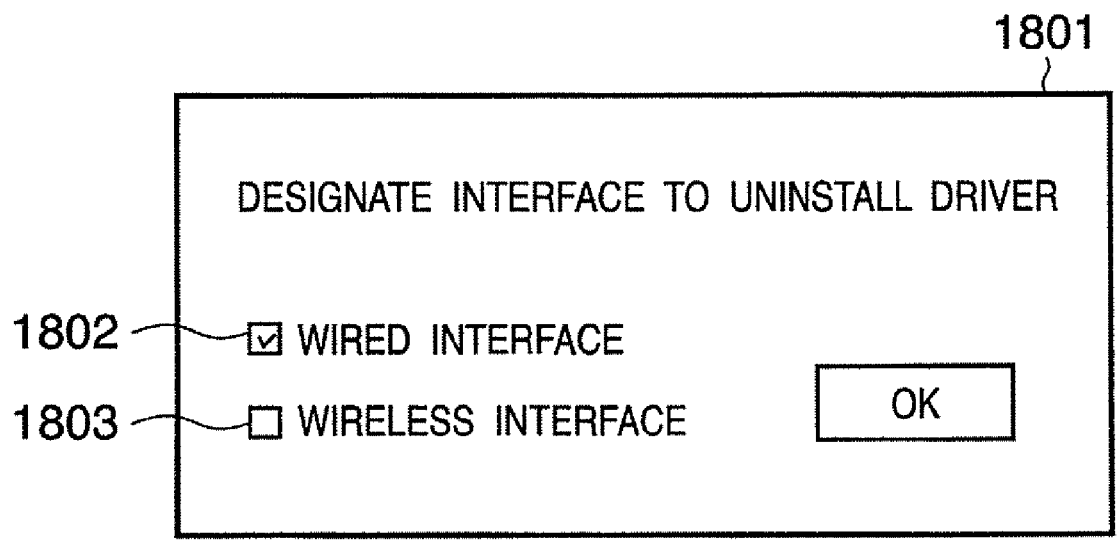
FIG. 18 shows an example of a multi-interface UI 1801.

After the multi-interface UI is displayed in step S1702, the printer 3000 checks if the user designates one or a plurality of interfaces on the UI shown in FIG. 18 (S1703). More specifically, since the interface designated in FIG. 18 is held in the RAM 22, the printer 3000 can attain the checking processing in step S1703 by referring to the RAM 22.

If the user designates one interface in step S1703, the printer 3000 generates one last bye request including the address corresponding to the designated interface (S1705). Note that the CPU 21 can read out that address since the address is held in the ROM 23 of the printer 3000 itself.

If the user designates the plurality of interfaces in step S1703, the printer 3000 reads out addresses corresponding to the plurality of designated interfaces from the ROM 23, and generates last bye requests as many as the number of designated interfaces (S1704).

The printer 3000 multicasts the last bye request (or requests) generated in step S1704, S1705, or S1708 (S1709).

Figure 17:
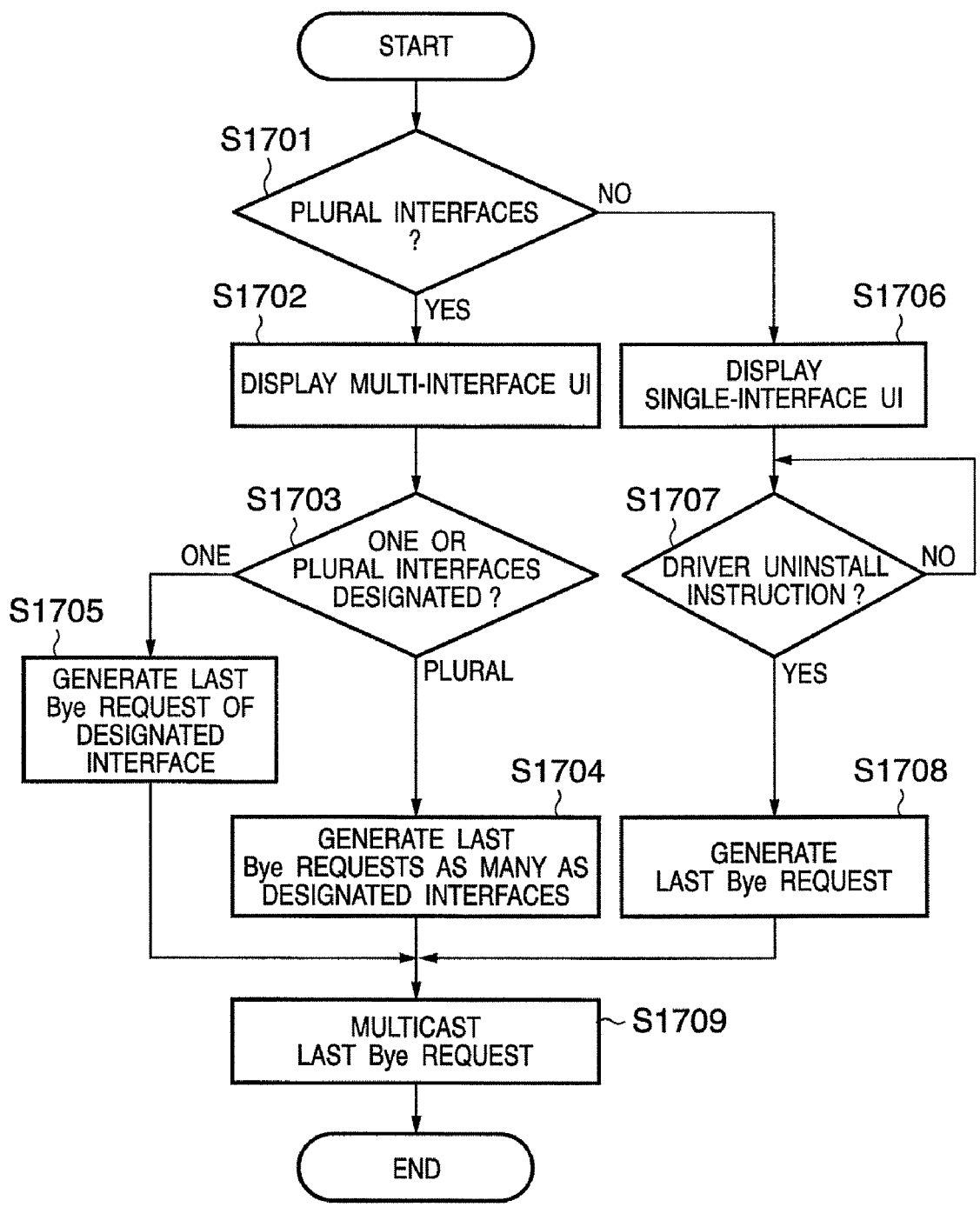
FIG. 17 is a flowchart showing the processing for generating last bye in a device having a plurality of interfaces.

By executing the processing described in FIG. 17, the printer having a plurality of interfaces can generate a last bye request (or requests) by designating the interface (or interfaces). Therefore, a driver (or drivers) corresponding to the interface (or interfaces) which will not be used can be uninstalled, thus implementing uninstall processing that reflects the user's intention and network environment.

FIG. 18 shows the multi-interface UI 1801. The multi-interface is displayed on, e.g., the control panel 30 of the device. The example of FIG. 18 corresponds to the UI when the device has both the wired and wireless interfaces. When the user checks check boxes of a wired interface 1802 and wireless interface 1803, and presses an OK button, the printer 3000 reads out the addresses for the wireless and wired interfaces. The printer then generates two last bye requests respectively including the addresses of the wired and wireless interfaces, and sends them to the plurality of selected interfaces by multicast.

That is, when the device (peripheral device) comprises a plurality of interfaces, the user inputs an instruction to uninstall a corresponding device driver for each interface. When the user inputs instructions to uninstall a plurality of device drivers, the device sends Bye requests (leaving messages) including uninstall notifications to uninstall the plurality of device drivers. Note that the device of the present application may further comprise a print processor that executes print processing in response to a print request. The leaving message is a bye signal (a signal indicates leaving from the network) in the predetermined device search system (WSD).

Modification

In the second embodiment, the device sends Hello and Bye requests to the proxy, which sends these requests to the client. By contrast, the device may send the Hello and Bye requests to both the client and proxy 200. The operation of the proxy is nearly the same as that in the second embodiment, but since the Hello and Bye requests are also sent to the client, step 709 in FIG. 11 and step 906 in FIG. 13 can be omitted. Other requests are the same as those in the second embodiment.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). The objects of the present invention are also achieved by supplying a recording medium (or storage medium), which records a program code of a software program that can implement the functions of the above-mentioned embodiments to the system or apparatus, and reading out and executing the program code stored in the storage medium by a computer of the system or apparatus. In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code. Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-313161, filed Oct. 27, 2005, which is hereby incorporated by reference herein in its entirety.

What is claimed is:

1. An information processing apparatus which can communicate with a peripheral device that issues a message including state information, comprising:

a computer processor configured to execute at least one computer program, the at least one computer program comprising program code that when executed by the computer processor implements:

a reception unit configured to receive a leaving message from the peripheral device, wherein the leaving message indicates that the peripheral device is leaving a network;

a determination unit configured to determine a type of the leaving message based on information included in the leaving message;

an uninstall unit configured to uninstall, when the determination unit determines that the type of the leaving message is a last leaving message indicating that the peripheral device which sent the leaving message is going to be permanently disconnected from the network, the device driver corresponding to the peripheral device that sent the leaving message; and a display switch unit configured to switch, when the determination unit determines that the type of the leaving message is not the last leaving message but state information indicating a status of the peripheral device, an image representing the peripheral device to an image corresponding to the status indicated by the state information of the peripheral device and to display the image corresponding to the status indicated by the state information of the peripheral device and to display additional information contained in the leaving message, without uninstalling the device driver in accordance with the leaving message, wherein the display switch unit switches, when the determination unit determines that the type of the leaving message is neither the last leaving message nor the state information, an image representing the peripheral device to an image indicating that the peripheral device is unavailable and displays the image indicating the peripheral device is unavailable, without uninstalling the device driver in accordance with the leaving message, and wherein the display switch unit switches, upon receiving an entry request from the peripheral device, the image representing the peripheral device from the image indicating that the peripheral device is unavailable to an image indicating a normal image representing the peripheral device.

2. The apparatus according to claim 1, wherein, when the determination unit determines that the state information included in the leaving message is information indicating a pause state, the display switch unit switches the image representing the peripheral device that sent the leaving message to an image corresponding to the pause state and displays the image corresponding to the pause state, and wherein, when the determination unit determines that the state information included in the leaving message is information indicating a trouble state, the display switch unit switches the image corresponding to the peripheral device that sent the leaving message to an image corresponding to the trouble state and displays the image corresponding to the trouble state.

3. The apparatus according to claim 1, further comprising a user interface display unit configured to display, when the determination unit determines that the type of the leaving message is the last leaving message, a user interface window configured to instruct whether or not a driver program corresponding to the peripheral device that notified leaving using the last leaving message is to be uninstalled, and wherein, when an uninstall instruction is issued via the user interface window, the uninstall unit uninstalls the driver program corresponding to the peripheral device that notified leaving using the last leaving message.

4. A method of controlling an information processing apparatus which can communicate with a peripheral device that issues a message including state information, comprising:

receiving a leaving message from the peripheral device, wherein the leaving message indicates that the peripheral device is leaving a network;

determining a type of the leaving message based on information included in the leaving message;

uninstalling, when it is determined that the type of the leaving message is a last leaving message indicating that the peripheral device which sent the leaving message is going to be permanently disconnected from the network, the device driver corresponding to the peripheral device that sent the leaving message;

switching, when it is determined that the type of the leaving message is not the last leaving message but state information indicating a status of the peripheral device, an image representing the peripheral device to an image corresponding to the status indicated by the state information of the peripheral device and displaying the image corresponding to the status indicated by the state information of the peripheral device and to display additional information contained in the leaving message, without uninstalling the device driver in accordance with the leaving message;

switching, when it is determined that the type of the leaving message is neither the last leaving message nor the state information, the image representing the peripheral to an image indicating that the peripheral device is unavailable and displaying the image indicating that the peripheral device is unavailable without uninstalling the device driver in accordance with the leaving message; and switching, upon receiving an entry request from the peripheral device, the image representing the peripheral device from the image indicating that the peripheral device is unavailable to an image indicating a normal image representing the peripheral device.

5. The method according to claim 4, further comprising:

switching, when it is determined that the state information included in the leaving message is information indicating a pause state, the image representing the peripheral device that sent the leaving message to an image corresponding to the pause state and displaying the image corresponding to the pause state; and switching, when it is determined that the state information included in the leaving message is information indicating a trouble state, the image representing to the peripheral device that sent the leaving message to an image corresponding to the trouble state.

6. The method according to claim 4, further comprising displaying, when it is determined that the type of the leaving message is the last leaving message, a user interface window configured to instruct whether or not a driver program corresponding to the peripheral device that notified leaving using the last leaving message is to be uninstalled, and wherein uninstalling the device driver includes uninstalling, when an uninstall instruction is issued via the user interface window, the driver program corresponding to the peripheral device that notified leaving using the last leaving message.

7. A non-transitory computer-readable recording medium which records a program making a computer execute a method of controlling an information processing apparatus which can communicate with a peripheral device that issues a message including state information, the method comprising:

receiving a leaving message from the peripheral device, wherein the leaving message indicates that the peripheral device is leaving a network;

determining a type of the leaving message based on information included in the leaving message;

uninstalling, when it is determined that the type of the leaving message is a last leaving message indicating that the peripheral device which sent the leaving message is going to be permanently disconnected from the network, the device driver corresponding to the peripheral device that sent the leaving message;

switching, when it is determined that the type of the leaving message is not the last leaving message but state information indicating a status of the peripheral device, an image representing the peripheral device to an image corresponding to the status indicated by the state information of the peripheral device and displaying the image corresponding to the status indicated by the state information of the peripheral device and to display additional information contained in the leaving message, without uninstalling the device driver in accordance with the leaving message;

switching, when it is determined that the type of the leaving message is neither the last leaving message the state information, the image representing the peripheral to an image indicating that the peripheral device is unavailable and displaying the image indicating that the peripheral device is unavailable without uninstalling the device driver in accordance with the leaving message; and switching, upon receiving an entry request from the peripheral device, the image representing the peripheral device from the image indicating that the peripheral device is unavailable to an image indicating a normal image representing the peripheral device.

8. The non-transitory computer-readable recording medium according to claim 7, wherein the method further comprises:

switching, when it is determined that the state information included in the leaving message is information indicating a pause state, the image representing to the peripheral device that sent the leaving message to an image corresponding to the pause state and displaying the image corresponding to the pause state; and switching, when it is determined that the state information included in the leaving message is information indicating a trouble state, the image representing to the peripheral device that sent the leaving message to an image corresponding to the trouble state.

9. The non-transitory computer-readable recording medium according to claim 8, wherein the method further comprises displaying, when it is determined that the type of the leaving message is the last leaving message, a user interface window configured to instruct whether or not a driver program corresponding to the peripheral device that notified leaving using the last leaving message is to be uninstalled, and wherein uninstalling the device driver includes uninstalling, when an uninstall instruction is issued via the user interface window, the driver program corresponding to the peripheral device that notified leaving using the last leaving message.

* * * * *